United States Patent
Heo et al.

(10) Patent No.: US 11,231,991 B2
(45) Date of Patent: Jan. 25, 2022

(54) SYSTEM ON CHIP AND MEMORY SYSTEM INCLUDING SECURITY PROCESSOR WITH IMPROVED MEMORY USE EFFICIENCY AND METHOD OF OPERATING SYSTEM ON CHIP

(71) Applicant: Samsung Electronics Co., Ltd., Suwon-si (KR)

(72) Inventors: In-goo Heo, Yongin-si (KR); Yoon-bum Seo, Hwaseong-si (KR); Young-jin Chung, Seongnam-si (KR); Jin-su Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 16/388,192

(22) Filed: Apr. 18, 2019

(65) Prior Publication Data
US 2020/0104208 A1 Apr. 2, 2020

(30) Foreign Application Priority Data
Oct. 2, 2018 (KR) .......................... 10-2018-0117870

(51) Int. Cl.
*G06F 11/10* (2006.01)
*G06F 11/14* (2006.01)
(Continued)

(52) U.S. Cl.
CPC ........ *G06F 11/1044* (2013.01); *G06F 3/0619* (2013.01); *G06F 3/0658* (2013.01); *G06F 3/0679* (2013.01); *G06F 11/1435* (2013.01)

(58) Field of Classification Search
None
See application file for complete search history.

(56) References Cited

U.S. PATENT DOCUMENTS 6,233,646 B1 * 5/2001 Hahm ..................... G06F 13/16
711/156
6,785,860 B1 * 8/2004 Patti .................... G06F 11/1072
714/764
(Continued)

FOREIGN PATENT DOCUMENTS

WO 2018063724 4/2018

OTHER PUBLICATIONS

Kong et al., Improving privacy and lifetime of PCM-based main memory, IEEE, Conference Paper, pp. 333-342. (Year: 2010).*

*Primary Examiner* — April Y Blair
*Assistant Examiner* — Dipakkumar B Gandhi
(74) *Attorney, Agent, or Firm* — Myers Bigel, P.A.

(57) ABSTRACT

An SOC includes a security processor. The security processor includes an encryption/ECC encoding processor configured to perform an encryption operation on data using Metadata and to generate ECC data by performing ECC encoding processing on encrypted data and the Metadata, a decryption/ECC decoding processor configured to extract the encrypted data and the Metadata by performing ECC decoding processing using the ECC data and to recover the data by performing a decryption operation on the encrypted data using the Metadata, and an address controller configured to receive a first address related to storage of the data, to generate a second address based on the first address, and to perform an address generating operation identifying a same region in memory for storing the Metadata and the ECC data based on the second address.

20 Claims, 19 Drawing Sheets

(51) Int. Cl.
    *G06F 3/06*         (2006.01)
    *G06F 11/22*      (2006.01)

(56) References Cited

U.S. PATENT DOCUMENTS

| | | | |
|---|---|---|---|
| 7,454,592 B1 * | 11/2008 | Shah | G06F 16/137 |
| | | | 711/216 |
| 2007/0079217 A1 * | 4/2007 | Haugan | G06F 11/1048 |
| | | | 714/763 |
| 2009/0125726 A1 * | 5/2009 | Iyer | G11C 16/22 |
| | | | 713/189 |
| 2011/0246791 A1 | 10/2011 | Kambayashi | |
| 2011/0314354 A1 * | 12/2011 | Fillingim | G06F 11/1048 |
| | | | 714/760 |
| 2012/0089843 A1 * | 4/2012 | Kato | G06F 21/10 |
| | | | 713/176 |
| 2012/0173925 A1 * | 7/2012 | Lahdensivu | H04L 67/1097 |
| | | | 714/15 |
| 2016/0085692 A1 | 3/2016 | Kwok | |
| 2016/0179702 A1 | 6/2016 | Chhabra | |
| 2016/0180947 A1 * | 6/2016 | Lim | G11C 29/04 |
| | | | 365/185.12 |
| 2016/0314042 A1 * | 10/2016 | Plants | G06F 3/0656 |
| 2016/0344428 A1 | 11/2016 | Wang | |
| 2017/0091119 A1 | 3/2017 | Chhabra | |
| 2017/0286311 A1 * | 10/2017 | Juenemann | G06F 12/023 |
| 2018/0062843 A1 | 3/2018 | Gopal | |
| 2018/0069658 A1 * | 3/2018 | Benisty | G06F 11/00 |
| 2018/0181499 A1 | 6/2018 | Branco | |
| 2019/0043600 A1 * | 2/2019 | Saileshwar | G06F 11/1048 |

* cited by examiner

SYSTEM ON CHIP AND MEMORY SYSTEM INCLUDING SECURITY PROCESSOR WITH IMPROVED MEMORY USE EFFICIENCY AND METHOD OF OPERATING SYSTEM ON CHIP

CROSS-REFERENCE TO RELATED APPLICATION

This application claims the benefit of Korean Patent Application No. 10-2018-0117870, filed on Oct. 2, 2018, in the Korean Intellectual Property Office, the disclosure of which is incorporated herein in its entirety by reference.

BACKGROUND

The inventive concepts relate to a system on chip (SOC), and more particularly, to a SOC and a memory system including a security processor with improved use efficiency and a method of operating the SOC.

As the amount of information stored in an electronic system increases, the number of SOCs and memories that process data may increase. For example, an error correction code (ECC) function and a function of encrypting/decrypting information may be applied to an automotive SOC and memory that need to endure high temperatures and need high security and, accordingly, the automotive SOC and the memory may be protected against a security attack against information processed and/or stored therein.

To apply the above-described ECC function and encryption/decryption function, it may be necessary to generate additional data (for example, metadata and ECC data) other than real data (original data) and to store the additional data in the memory. However, because the ECC function and the encryption/decryption function are separately performed, the metadata and the ECC data are separately managed and, accordingly, memory use efficiency may deteriorate and the performance of a system may deteriorate due to the increase in write/read time associated with processing the additional data.

SUMMARY

The inventive concept may provide a system on chip (SOC) and a memory system including a security processor capable of reducing time and power spent on data encryption processing and efficiently using memory and a method of operating the SOC.

According to an aspect of the inventive concept, there is provided a SOC including a security processor configured to perform an encryption/decryption operation on data and an error correction code (ECC) operation on the data. The security processor includes an encryption/ECC encoding processor configured to perform an encryption operation on data using Metadata and to generate ECC data by performing ECC encoding processing on encrypted data and the Metadata, a decryption/ECC decoding processor configured to extract the encrypted data and the Metadata by performing ECC decoding processing using the ECC data and to recover the data by performing a decryption operation on the encrypted data using the Metadata, and an address controller configured to receive a first address related to storage of the data, to generate a second address based on the first address, and to perform an address generating operation identifying a same region in memory for storing the Metadata and the ECC data based on the second address.

In a SOC and a memory system including a security processor according to the inventive concept and a method of operating the SOC, in a system having a security function for information stored in memory, it may be possible to reduce time and power spent on processing information such as data encryption/decryption.

In addition, in a SOC and a memory system including a security processor according to the inventive concept and a method of operating the SOC, because various kinds of information items may be integrally managed and may be stored in or read from the memory, it may be possible to improve memory use efficiency and to increase an amount of information stored in the memory.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
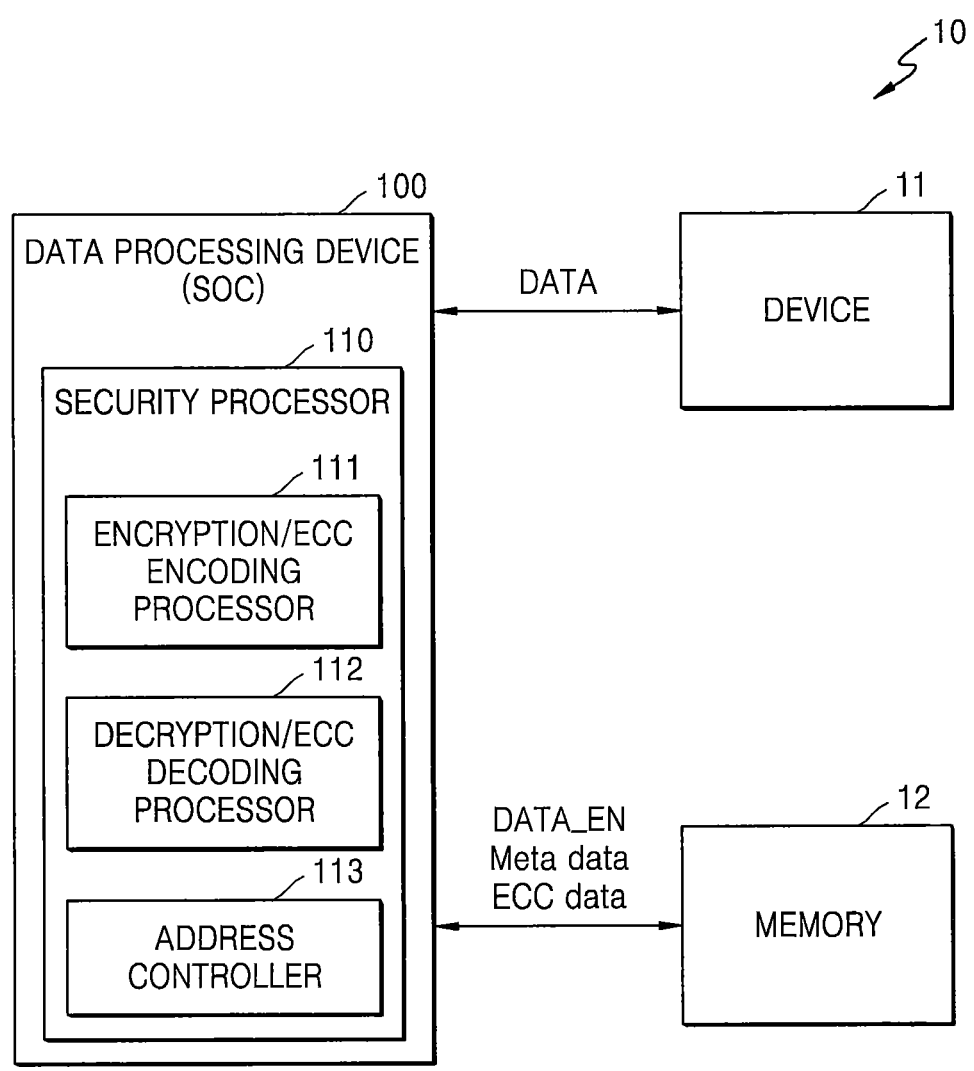
FIG. 1 is a block diagram illustrating a system on chip (SOC) according to some embodiments of the inventive concept and an information processing system including the same.

The inventive concept will now be described more fully with reference to the accompanying drawings, in which example embodiments of the inventive concept are shown. Like reference numerals may refer to like elements throughout this application. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

Due to technologies, such as a connected car, V2X, and an advanced driver assistance system (ADAS), the number of system on chips (SOC) and memories that are mounted on a vehicle is generally increasing. Taking dynamic random access memory (DRAM) as an example, automotive DRAM has to endure severe temperature conditions unlike DRAM use in other products and security in an automotive DRAM may be provided. Accordingly, an error correction code (ECC) function may be applied to an automotive DRAM. In addition, to protect information, such as autonomous driving information and payment information that are processed by an SOC (for example, an ADAS SOC) used in an ADAS, an encryption and decryption function may be used to protect the information from a security attack.

When the ECC function and the encryption function are used in an SOC and memory, additional data may be requested together with real data (for example, original data) and the additional data may be stored in the memory together with encrypted data obtained by encrypting the original data. For example, when the ECC function is applied, in accordance with an ECC algorithm and an error correction range, additional parity or syndrome from 1 bit to 10 bits may be generated per 32-bit data. In addition, when the encryption function is used, version information is used for the encryption operation to perform safer encryption or a message authentication code (MAC) may be used for an integrity check and Metadata items used for the encryption operation may be stored in the memory together with the encrypted data.

FIG. 1 is a block diagram illustrating an SOC according to some embodiments of the inventive concept and an information processing system 10 including the same. For example, the information processing system 10 may include an SOC implemented by a semiconductor chip as a data processing device 100 and a device 11 and memory 12 that transmit data DATA, such as an image to the data processing device 100. The device 11 may provide various kinds of data DATA. For example, when the information processing system 10 corresponds to an autonomous driving system (or an autonomous driving module), the device 11 may be a camera device that performs a photographing operation by using a camera lens. In addition, when the information processing system 10 corresponds to the autonomous driving system, the data processing device 100 may be referred to as an ADAS SOC.

According to embodiments of the inventive concept, a method of integrally performing and managing an error correction code (ECC) function and an encryption and decryption function may be provided. For example, a method of efficiently utilizing a storage space and bandwidth of the memory 12 by integrally managing ECC data and Metadata that are additional data items used by various functions through a device that integrally performs the ECC function and the encryption and decryption function may be provided. Purposes and objects of the ECC data and the Metadata are typically different from each other. However, timing and access patterns of the ECC data and the Metadata, which are read from the memory 12, may be similar to each other. Therefore, in comparison with examples in which the ECC function and the encryption and decryption function are separately performed, performance may improve and power consumption may be reduced by managing the ECC data and the Metadata together.

The memory 12 may be implemented by one or more of various kinds of volatile memories and/or non-volatile memories. For example, the memory 12 may be implemented by one or more of various kinds of dynamic random access memories (DRAM), such as double data rate synchronous dynamic random access memory (DDR SDRAM), low power double data rate (LPDDR) SDRAM, graphics double data rate (GDDR) SDRAM, and rambus dynamic random access memory (RDRAM).

The data processing device 100 may include a security processor 110. The security processor 110 may include an encryption/ECC encoding processor 111, a decryption/ECC decoding processor 112, and an address controller 113. The encryption/ECC encoding processor 111 may perform an encryption operation on data generated by the data processing device 100 or the data DATA from the device 11. Encrypted data DATA_EN may be stored in the memory 12 under control of the data processing device 100.

The encryption/ECC encoding processor 111 may perform an encryption operation in accordance with various methods. For example, an encryption operation based on a symmetrical key algorithm, such as an advanced encryption standard (AES) algorithm or data encryption standard (DES) algorithm, may be performed or various kinds of encryption operations based on asymmetrical key algorithms, such as the Rivest Shamir Adleman (RSA) algorithm and an elliptic curve cryptography (ECC) algorithm may be performed. Embodiments of the inventive concept are not limited to particular kinds of encryption operations. In addition, the Metadata may be used for the encryption operation. The Metadata may be also stored in the memory 12. The decryption/ECC decoding processor 112 performs a decryption operation on the encrypted data DATA_EN read from the memory 12 and may generate original data through the decryption operation. For example, decryption processing is performed through an operation using the encrypted data DATA_EN and the Metadata may be generated based on an algorithm applied to the encryption operation and the original data.

In other embodiments of the inventive concept, in performing a security function for the data DATA, an ECC operation including ECC encoding and decoding may also be performed. For example, the encryption/ECC encoding processor 111 may perform ECC encoding processing in a write operation in the memory 12. In addition, the decryption/ECC decoding processor 112 may perform ECC decoding processing in a read operation from the memory 12. According to some embodiments, in a process of writing the data DATA in the memory 12, the encryption/ECC encoding processor 111 performs the encryption operation and may generate the ECC data through the ECC encoding processing for the encrypted data DATA_EN and the Metadata. The ECC data may include first ECC data related to the encrypted data DATA_EN and second ECC data related to the Mata data.

The data processing device 100 may perform a control operation for storing the encrypted data DATA_EN, the Metadata, and the ECC data that are generated as described above in the memory 12. For example, the address controller 113 may generate an address that indicates a position in which the Metadata and the ECC data are stored in the memory 12. In addition, the address controller 113 may generate an address indicating a position in which the encrypted data DATA_EN is stored in the memory 12.

For example, the security processor 110 may receive a first address that represents the position in which the data DATA is stored in the memory 12 with a request for writing the data DATA and the address controller 113 may generate a second address that represents the position in which the Metadata and the ECC data are stored based on the first address. According to some embodiments, the security processor 110 may perform the control operation so that the encrypted data DATA_EN is stored in the position indicated by the first address in the memory 12 in accordance with an external request. In other embodiments, the address controller 113 may further generate a third address that represents a position in which the encrypted data DATA_EN is stored based on the first address and the encrypted data DATA_EN may be stored in the position represented by the third address in the memory 12.

According to the above-described embodiment, as the Metadata and the ECC data are integrally managed, the Metadata and the ECC data may be stored in the position indicated by the second address. In the integral management, addresses are not separately generated for the Metadata and the ECC data, but the addresses are generated to correspond to data units including the Metadata and the ECC data. One or more second addresses may be generated in accordance with the size of a storage space of the memory 12, which is indicated by the second address. At least some of the Metadata and the ECC data may be stored in the memory 12 by the second address.

According to an exemplary embodiment, at least some of the Metadata and the ECC data may be stored in a storage space positioned in the same row or in the same column of the memory 12. Therefore, the time (for example, a write cycle) spent on storing the Metadata and the ECC data may be reduced and the time (for example, a read cycle) spent on reading the Metadata and the ECC data used for decoding the encrypted data DATA_EN may be reduced.

Moreover, as a write or read request for the data DATA is received, an operation of generating an address for storing the Metadata and the ECC data may be performed by the address controller 113 independent of the encryption/ECC encoding processor 111 and the decryption/ECC decoding processor 112. For example, during an operation of writing the data DATA, a size of the metadata used for generating the encrypted data DATA_EN and a size of the ECC data generated by the ECC operation may have previously set values. The second address for integrally storing the metadata and the ECC data may be generated based on the size of the ECC data. According to some embodiments, the storage space of the memory 12 may include first and second regions (not shown). The encrypted data DATA_EN is stored in a first region in response to the first address and the Metadata and the ECC data may be stored in the second region in response to the second address.

According to the above-described embodiments of the inventive concept, because the Metadata and the ECC data may be integrally managed, the memory 12 may be used more efficiently and access efficiency may improve.

As shown in FIG. 1, the encryption/ECC encoding processor 111 and the decryption/ECC decoding processor 112 are illustrated as separate functional blocks. However, embodiments of the inventive concept are not limited thereto. For example, an encryption processor, a decryption processor, an ECC encoding processor, and an ECC decoding processor may be illustrated as separate functional blocks. In other embodiments, the encryption processor and the decryption processor may be illustrated as the same functional block and the ECC encoding processor and the ECC decoding processor may be illustrated as the same functional block. In other words, the functionality provided by the security processor may be divided into one or more functional blocks for implementation with the various functional capabilities being assigned to each of the one or more blocks in any combination.

In further embodiments of the inventive concept, the security processor 110 may include hardware components and, accordingly, one or more functional aspects of the security processor 110 may be implemented through signal processing as hardware. In other embodiments, one or more functional aspects of the security processor 110 may be implemented as software by a processor executing a computer program. In further embodiments, one or more functional aspects of the security processor 110 may be implemented by a combination of hardware and software.

Figure 2:
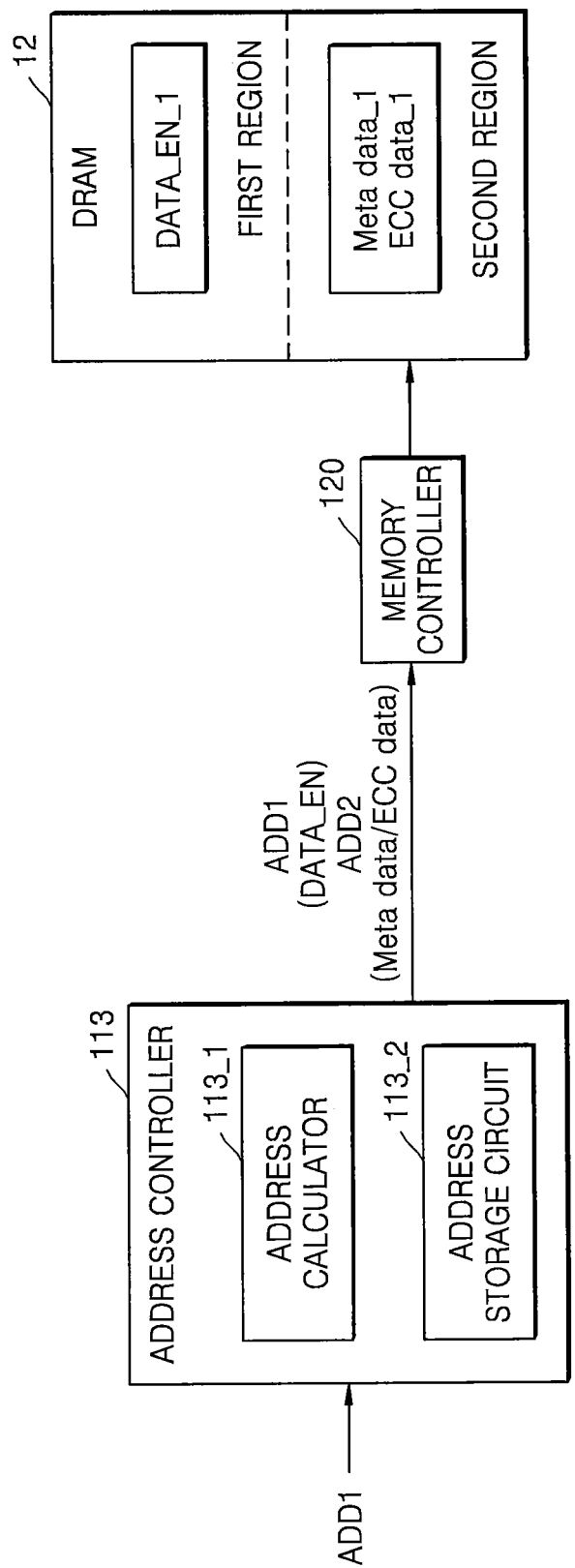
FIG. 2 is a block diagram illustrating an example of storing information in the memory of the information processing system of FIG. 1.

FIG. 2 is a block diagram illustrating an example of storing information in the memory of the information processing system of FIG. 1.

Referring to FIGS. 1 and 2, the address controller 113 may provide a first address ADD1 used for storing the encrypted data DATA_EN and a second address ADD2 used for storing the Metadata and the ECC data, and the memory 12 that may be implemented by DRAM may include the first region and the second region. The first address ADD1 used for storing the encrypted data DATA_EN may be generated by the address controller 113. In other embodiments, the first address ADD1 is provided from the outside (e.g., outside of the data processing device 100, outside of the security processor 110, and/or outside of the address controller 113, but within the security processor 110) to the address controller 113 and the address controller 113 may provide the received first address ADD1 to the memory 12. In FIG. 2, an example, in which the first address ADD1 and the second address ADD2 from the address controller 113 are provided to the memory 12 through a memory controller 120, is illustrated. The memory controller 120 may be provided in the data processing device 100 in some embodiments of the inventive concept.

The address controller 113 may receive the first address ADD1, for example, from the outside (e.g., from outside of the data processing device 100, outside of the security processor 110, and/or outside of the address controller 113, but within the security processor 110) and may generate the second address ADD2 used for storing the Metadata and the ECC data by using the first address ADD1. When a data write operation is taken as an example, the address controller 113 may receive the first address ADD1 generated under control of a predetermined functional block (for example, a CPU) in the SOC 100.

The first address ADD1 may represent the position in which the encrypted data DATA_EN is stored in the memory 12. The Metadata and the ECC data that are generated by the encryption operation and the ECC operation may have a size corresponding to a predetermined ratio with respect to that of the encrypted data DATA_EN. The address controller 113 may calculate the position of the second region and the size of the storage space in which the Metadata and the ECC data are stored, generate the second address ADD2 in accordance with a calculation result, and may provide the generated second address ADD2 to the memory controller 120. For example, the second address ADD2 may include information on a starting position in which the Metadata and the ECC data are stored and a size of the Metadata and the ECC data.

As an implementation example, the address controller 113 may include an address calculator 113_1 and an address storage circuit 113_2. The address calculator 113_1 may calculate the second address ADD2 with reference to the above-described first address ADD1 and the size of the additional data (or a ratio of the additional data to that of the data). In addition, the address storage circuit 113_2 may store the second address ADD2 corresponding to the first address ADD1. The previously calculated and stored second address ADD2 may be provided to the memory 12 when a data read request for the first address ADD1 is received.

The memory controller 120 may communicate with the memory 12, provide a command and an address to the memory 12, transmit the encrypted data DATA_EN, the Metadata, and the ECC data to the memory 12 in accordance with a predetermined bandwidth, and may read the encrypted data DATA_EN, the Metadata, and the ECC data from the memory 12. In accordance with a predetermined defined size unit, the encryption operation may be performed on the data DATA. When first data is taken as an example, first encrypted data DATA_EN_1 obtained by encrypting the first data is stored in the first region of the memory 12 and Metadata Metadata_1 and ECC data ECC data_1 that correspond to the first encrypted data DATA_EN_1 may be stored in the second region of the memory 12. When the sum of the Metadata and the ECC data is smaller than a data bandwidth between the memory 12 and the memory controller 120, the Metadata and the ECC data may be written together in the second region of the memory 12 by performing a single write operation.

Figure 3:
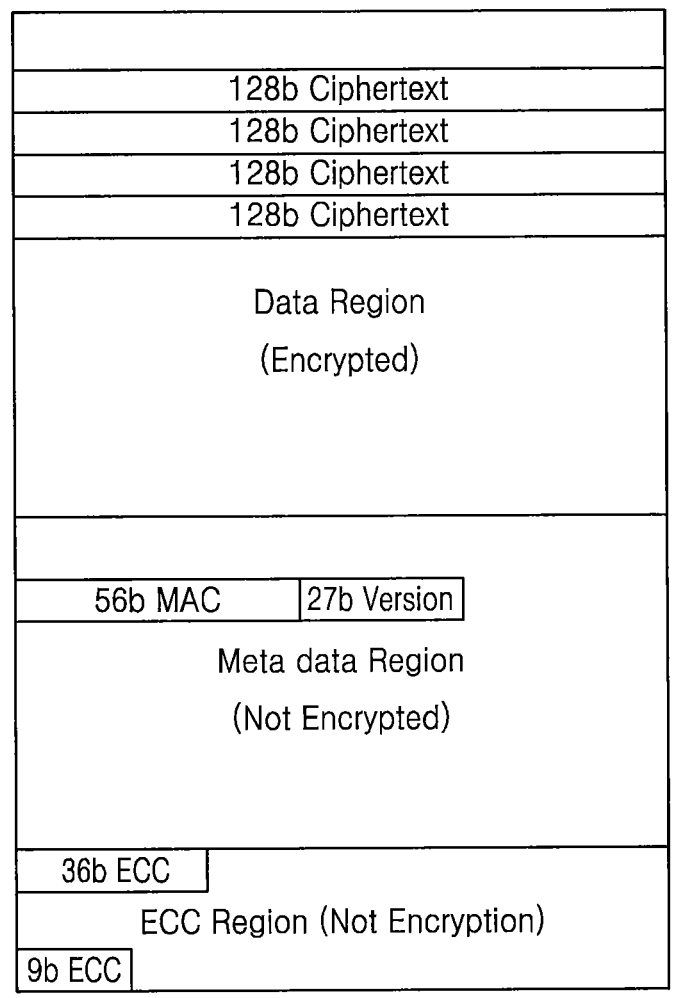
FIGS. 3 and 4 are block diagrams illustrating examples in which Metadata and error correction code (ECC) data are stored in memory where the Metadata and the ECC data are separately managed and where the Metadata and the ECC data are managed together, respectively.
Figure 4:
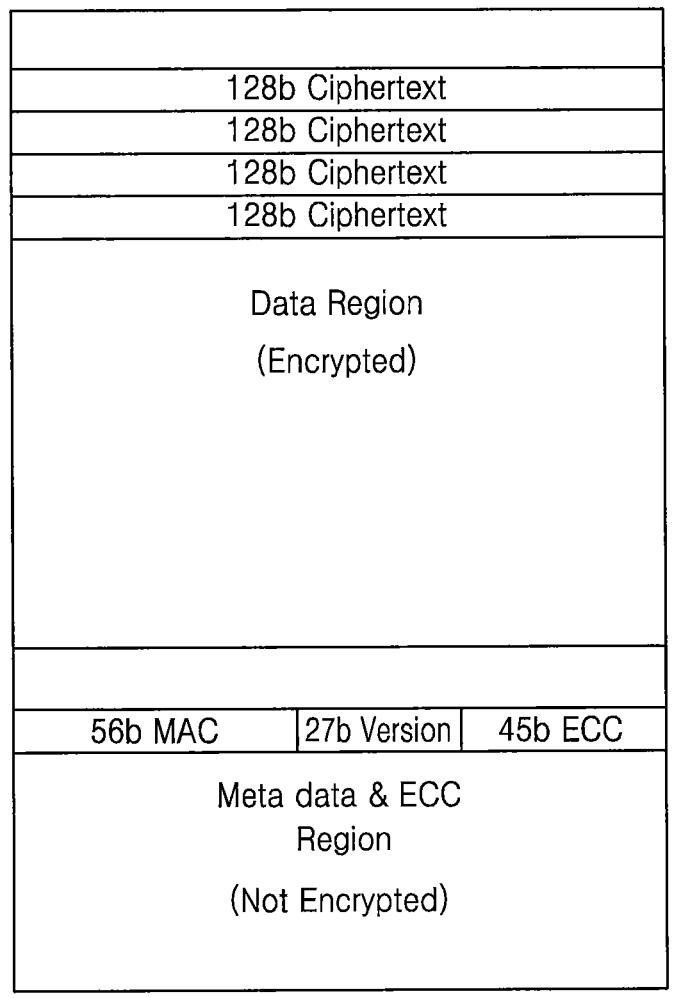

FIGS. 3 and 4 are block diagrams illustrating examples in which Metadata and ECC data are stored in memory where the Metadata and the ECC data are separately managed and where the Metadata and the ECC data are managed together.

Referring to FIG. 3, when an encryption/decryption operation and the ECC operation are separately performed, because an encryptor/decryptor and an ECC processor are separate from each other, the encryptor/decryptor and the ECC processor may independently perform functions. As an address for storing the Metadata from the encryptor/decryptor and an address for storing the ECC data from the ECC processor are separate from each other, the Metadata and the ECC data may be stored in different positions in the memory.

For example, an encryption operation of data may performed by cache line. When AES, which is a block code standard in which a cache line is configured to be 64 B and is processed to be 128b, is used as an encryption algorithm, data of one cache line may be encrypted and decrypted as four sets of 128 bit-encrypted data. In addition, the encryption operation may be performed in accordance with various operation modes. For example, when a CounTeR (CTR) mode is used, a key stream used in relation to the encryption operation may include a 69-bit nonce, a 32-bit address, and a 27-bit version counter. Because the 27-bit version counter increases whenever new data is written in the corresponding cache line, in relation to the encryption operation, the 27-bit version counter may be stored in the memory as the Metadata.

The memory includes a plurality of regions, for example, a first region (an encrypted data region), a second region (a Metadata region), and a third region (an ECC data region). Encrypted data Ciphertext in units of 128b may be stored in the first region. In addition, as the encryption operation and the ECC operation are separately performed, the Metadata and the ECC data may be stored in separate regions. For example, the Metadata is stored in the second region and the ECC data may be stored in the third region. In addition, for an integrity check, a 56-bit MAC may be generated for the 64 B-encrypted data Ciphertext and the version counter and the MAC may be stored in the second region as the Metadata. The MAC may be generated through various algorithms, such as SHA, SHA256, and SHA384 or an algorithm MD5. When the encrypted data Ciphertext is read, the MAC may be read together. The MAC calculated by the encrypted data Ciphertext and the MAC read from the memory are compared with each other and, accordingly, forgery may be detected. According to some embodiments, the version counter and the MAC may be stored in the memory without being encrypted and decrypted.

In some embodiments, ECC processing may be performed by various kinds of algorithms or methods. For example, single-bit error correction and double-bit error detection (SEC-DED), in which one error may be corrected and two errors may be detected, respectively, for a 128-bit unit, may be used in some embodiments. In an example of the SEC-DED method, 9-bit ECC data may be generated per 128 bits and 36-bit ECC data may be generated for 64 B-encrypted data Ciphertext. In addition, the ECC processing may be performed on the Metadata and 9-bit ECC data may be generated for all 83-bit Metadata. Therefore, 45-bit ECC data is generated and the ECC data may be stored in the third region of the memory. According to the example illustrated in FIG. 3, the Metadata and the ECC data may be stored in separate regions. In addition, because the ECC processor may determine that the encrypted data Ciphertext and the Metadata on which the ECC encoding is to be performed are separate data items, the ECC data (for example, the first ECC data) for the encrypted data Ciphertext and the ECC data (for example, the second ECC data) for the Metadata may be stored in different positions in the third region.

Referring to FIG. 4, according to some embodiments of the inventive concept, the Metadata and the ECC data may be integrally managed. For example, an address for integrated access to the Metadata and the ECC data may be generated. For example, the Metadata, the first ECC data, and the second ECC data may be integrally stored in the same contiguous region in the memory. Therefore, the Metadata, the first ECC data, and the second ECC data may be stored in or read from the memory through a relatively small number of accesses. For example, the address generating operation may be controlled and accordingly, the memory includes the first region for storing the encrypted data Ciphertext and the Metadata, the first ECC data, and the second ECC data are mapped in the same region (for example, the second region) of the memory. In FIG. 4, an example, in which the Metadata and the ECC data are stored in a row of the memory because a size of the memory provided in a row of the memory is greater than the sum of a size of a 56-bit of MAC, a size of a 27-bit of version counter, and a size of 45-bit of ECC data, is illustrated.

A bandwidth (for example, a data bandwidth) for transmitting and receiving data between the memory and the memory controller may be various sizes in accordance with different embodiments. An input and output unit between the memory and the memory controller may be defined in accordance with the bandwidth. As the sum of a size of the Metadata and a size of the ECC data may be smaller than the bandwidth, the Metadata and the ECC data may be managed in one input and output unit. Therefore, in comparison with the embodiment illustrated in FIG. 3, the number of accesses to the memory, which is used for encryption and decryption of data, may be reduced.

In FIGS. 3 and 4, the CTR mode is illustrated as an example of the encryption operation. However, embodiments of the inventive concept are not limited thereto. Various kinds of modes, such as an electric codebook (ECB) mode, a cipher block chaining (CBC) mode, a cipherfeedback (CFB) mode, and an output-feedback (OFB) mode may be may be used in accordance with various embodiments of the inventive concept.

Figure 5:
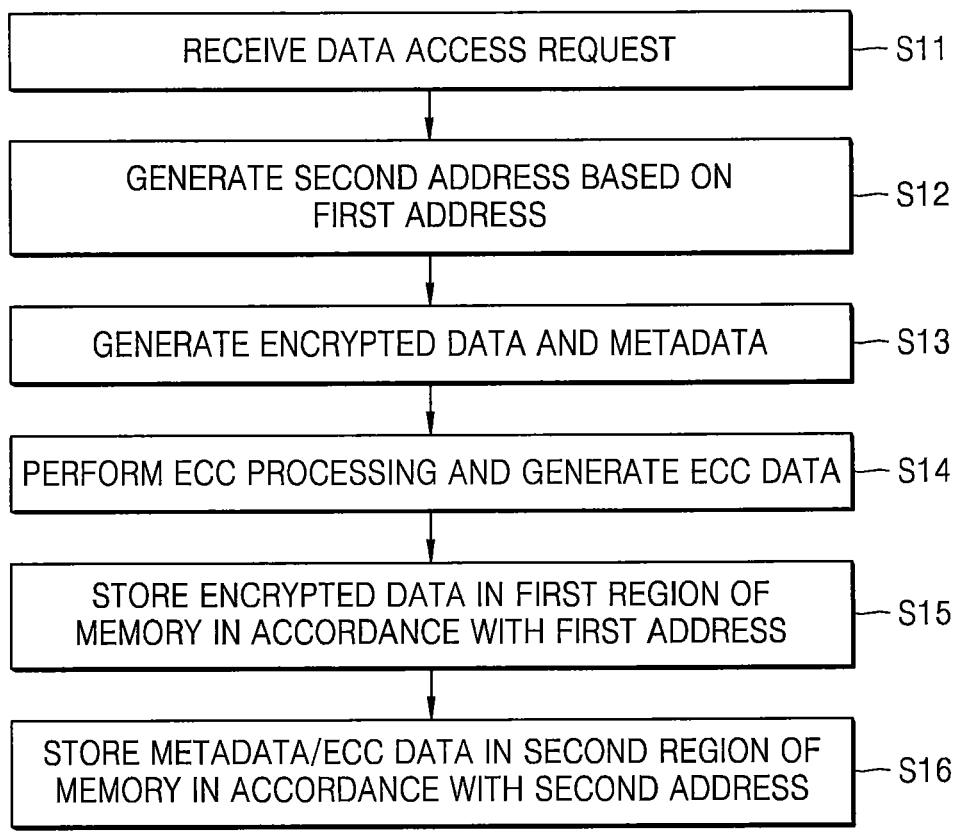
FIG. 5 is a flowchart illustrating a method of operating a SOC, according to some embodiments of the inventive concept.

FIG. 5 is a flowchart illustrating a method of operating a SOC according to some embodiments of the inventive concept. In FIG. 5, a data write operation is illustrated. However, an address generating operation and a data access operation may be identically or similarly performed in a data read operation.

Referring to FIG. 5, the SOC includes a security processor according to the above-described embodiments and the security processor may perform an encryption/decryption operation and an ECC operation on data. In addition, various kinds of additional data may be generated by performing the encryption/decryption operation and the ECC operation on the data. For example, the Metadata related to the encryption/decryption operation and the ECC data related to an ECC processing operation may be generated.

As a data access request from the outside (e.g., from outside of the data processing device 100, outside of the security processor 110, and/or outside of the address controller 113, but within the security processor 110) is provided to the SOC in operation S11, a component (for example, a central processing unit (CPU)) in the SOC may provide data (for example, original data) on which writing is to be performed and an address (for example, the first address) that represents a position in which the data is stored to the security processor. In addition, the security processor may generate the second address based on the first address used for storing encrypted data in operation S12. For example, the second address may be generated based on a size of the additional data (for example, the Metadata and the ECC data) corresponding to the original data. For example, as the second address includes the information on the position in which the Metadata and the ECC data start to be stored and the size of the Metadata and the ECC data, the memory controller 120 may store the Metadata and the ECC data in the position indicated by the second address from the security processor.

In other embodiments, the security processor may generate the encrypted data and the Metadata by performing the encryption operation on the received original data in operation S13. In addition, the ECC data may be generated by performing the ECC encoding processing on the encrypted data and the Metadata in operation S14. As in the above-described embodiment, the ECC data may include first ECC data obtained by performing the ECC encoding processing on the encrypted data and second ECC data obtained by performing the ECC encoding processing on the Metadata.

The security processor may manage the memory in two regions. For example, the address generating operation may be performed and, accordingly, a region (for example, the first region) in which the encrypted data is stored and a region (for example, the second region) in which the Metadata and the ECC data are stored are distinguished. Based on control of the security processor, the encrypted data is stored in the first region of the memory in accordance with the first address in operation S15 and the Metadata and the ECC data may be stored in the second region of the memory in accordance with the second address in operation S16.

According to the above-described embodiments, the Metadata and the ECC data corresponding to one encrypted data item may be stored in the same row or in the same column in the memory. In addition, in communication between the memory controller and the memory, because the size of the Metadata and the ECC data is smaller than a data bandwidth, the Metadata and the ECC data corresponding to one encrypted data item may be stored in the memory by performing a single access operation.

Figure 6:
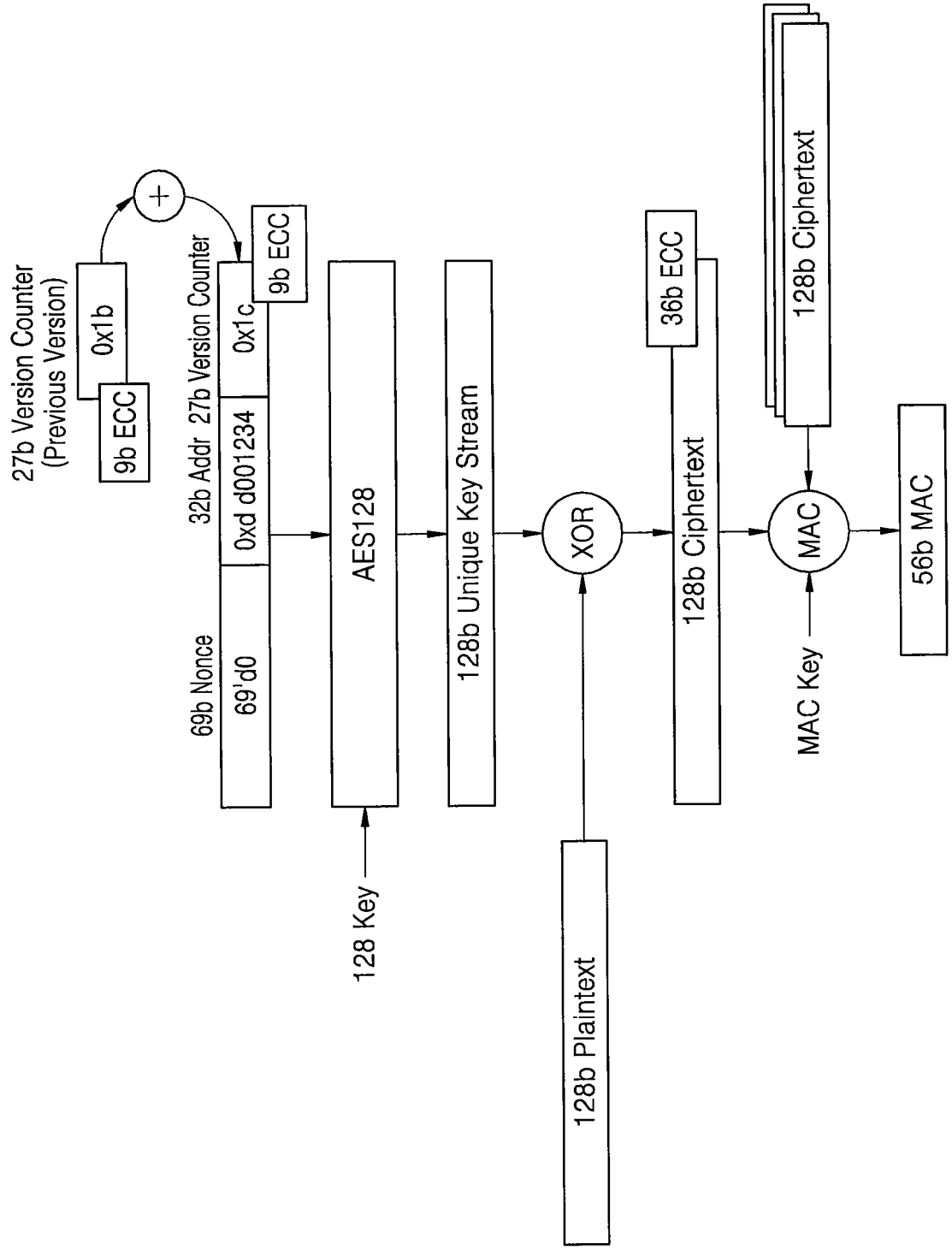
FIGS. 6 and 7 are a conceptual diagram and a flowchart illustrating examples of encryption operations and ECC encoding operations, respectively, according to some embodiments of the inventive concept.
Figure 7:
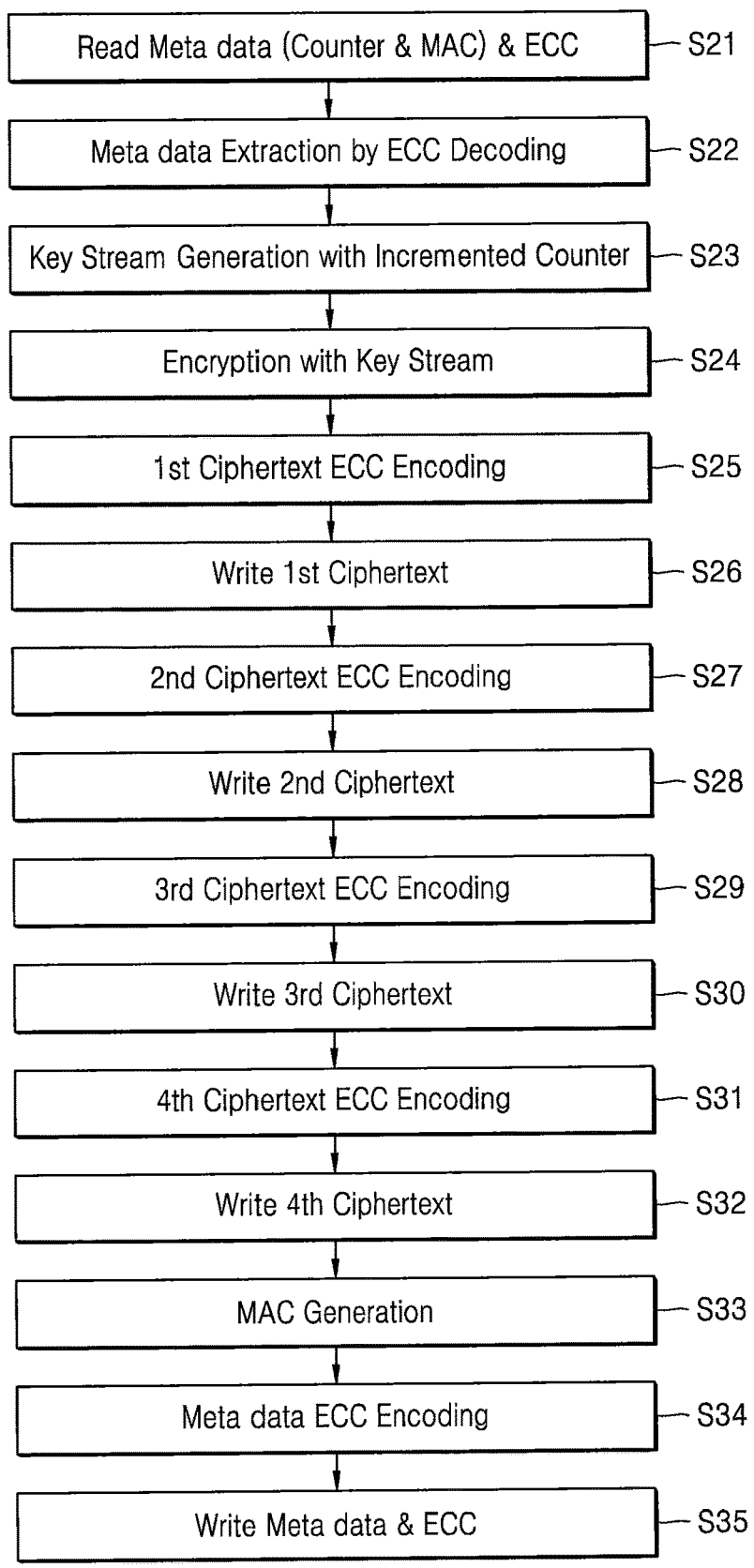

FIGS. 6 and 7 are a conceptual diagram and a flowchart illustrating examples of an encryption operation and an ECC encoding operation, respectively, according to some embodiments of the inventive concept. In the following embodiments, a CTR mode is illustrated as an example of the encryption operation. However, as described above, the embodiments of the inventive concept are not limited to a particular kind of the encryption operation.

As illustrated in FIG. 6, in encrypting the data and storing the encrypted data in the memory a version counter stored previously in memory may be read. For this purpose, the read operation may be performed on the Metadata and the ECC data with respect to the previously stored encrypted data. In addition, the 128-bit key stream used for the encryption operation (for example, the encryption operation using the AES algorithm) for data may be generated by using the 69-bit nonce, the 32-bit address, and the 27-bit version counter. The encrypted data Ciphertext may be generated through an operation (for example, XOR) using the 128-bit original data Plaintext and the 128-bit key stream. In addition, together with the 9-bit ECC data for the 27-bit version counter, the 36-bit ECC data for the 128-bit encrypted data Ciphertext may be generated. In addition, the 56-bit MAC may be generated by an operation through the 128-bit encrypted data Ciphertext and the MAC key.

Embodiments of an entire flow in accordance with the above-described encryption operation and the ECC encoding operation are illustrated in FIG. 7. For example, when an encryption operation of data (for example, first to fourth data items) corresponding to 128 bit*4 is taken as an example, the Metadata and the ECC data are read from the memory in operation S21, the Metadata is extracted through the ECC decoding operation in operation S22, and a key stream generating operation including a version counter may be performed in operation S23. In addition, the encryption operation using the key stream is performed in operation S24, the ECC encoding operation for the first encrypted data is performed in operation S25, and the first encrypted data may be written in the memory in operation S26.

The ECC encoding operation for second encrypted data and an operation of writing the second encrypted data may be performed in operations S27 and S28, respectively. The ECC encoding operation for third encrypted data and an operation of writing the third encrypted data may be performed in operations S29 and S30, respectively. In addition, the ECC encoding operation for fourth encrypted data and an operation of writing the fourth encrypted data may be performed in operations S31 and S32. In addition, according to the above-described embodiments, the MAC is generated through the MAC operation using the encrypted data in operation S33, the ECC encoding operation for the Metadata including the version counter and the MAC is performed in operation S34, and the generated Metadata and the ECC data may be stored in the memory.

In processing data, relatively large amounts of time and power may be commonly spent on writing and reading data in the flow illustrated in FIG. 7. However, according to some embodiments of the inventive concept, because the Metadata and the ECC data may be integrally read from the memory and the Metadata and the ECC data may be integrally stored in the memory, the time and power spent on processing data may be reduced.

Figure 8:
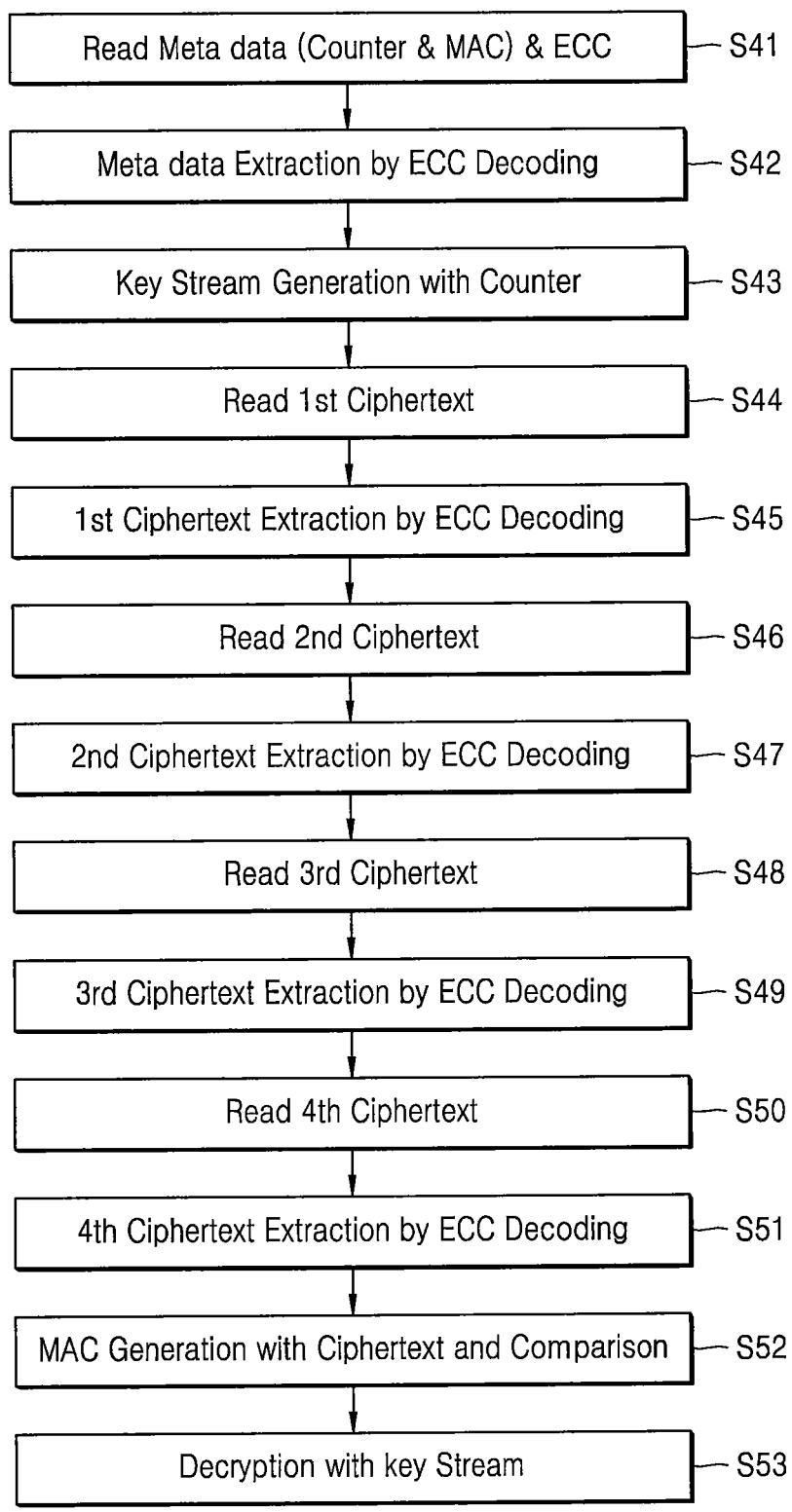
FIG. 8 is a flowchart illustrating examples of decryption operations and ECC decoding operations according to some embodiments of the inventive concept.

FIG. 8 is a flowchart illustrating examples of a decryption operation and an ECC decoding operation according to some embodiments of the inventive concept. Because concepts of the decoding operation and the ECC decoding operation that may be used in embodiments of the inventive concept may be performed in the reverse order of the encryption operation and the ECC encoding operation of FIG. 6, detailed descriptions thereof will not be given.

As illustrated in FIG. 8, when the decoding operation for the encrypted data corresponding to 128 bits*4 is taken as an example, the Metadata including the version counter and the MAC and the ECC data may be read from the memory in operation S41 and the read information may be temporarily kept by the security processor. In addition, the Metadata is extracted through the ECC decoding operation in operation S42 and the key stream generating operation including the version counter may be performed in operation S43. In addition, the ECC encoded first encrypted data may be read from the memory in operation S44 and the first encrypted data may be extracted by performing the ECC decoding operation in operation S45. The second encrypted data may be extracted through the read operation and the ECC decoding operation for the second encrypted data may be performed in operations S46 and S47, respectively, the third encrypted data may be extracted through the read operation and the ECC decoding operation for the third encrypted data may be performed in operations S48 and S49, respectively. In addition, the fourth encrypted data may be extracted through the read operation and the ECC decoding operation for the fourth encrypted data may be performed in operations S50 and S51, respectively. In addition, according to the above-described embodiments, the MAC is generated through the MAC operation using the encrypted data, a comparison operation may be performed between the generated MAC and the MAC read from the memory in operation S52, and the decoding operation using the key stream may be performed in operation S53.

According to the above-described embodiment, a process of reading the ECC data for the Metadata and the encrypted data and the ECC data for the Metadata may be performed through a read operation. Therefore, the number of accesses to the memory may be reduced and, accordingly, the time and power spent on a process of decoding the encrypted data may be reduced.

Figure 9:
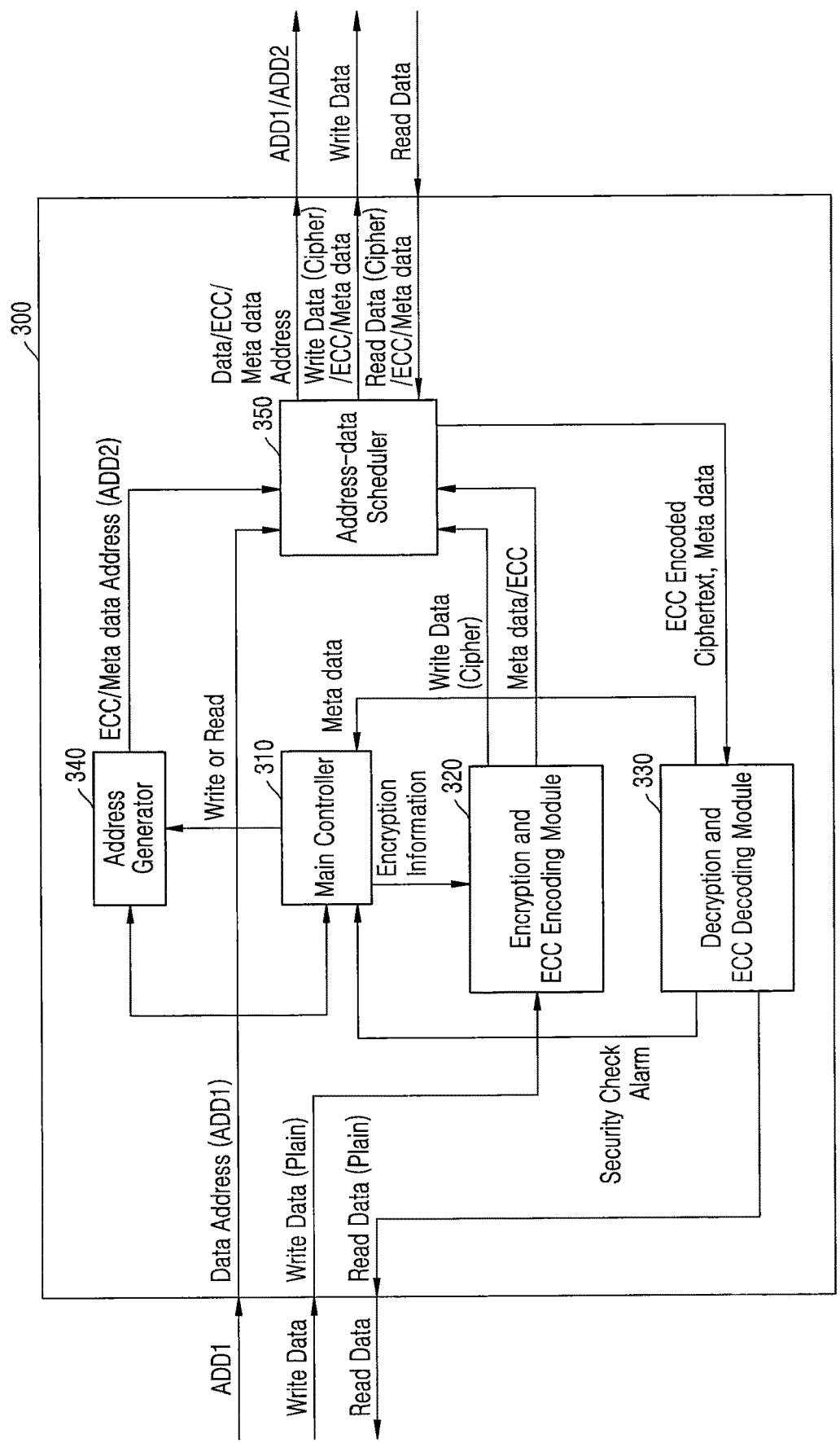
FIGS. 9 and 10 are block diagrams illustrating examples of a security processor according to some embodiments of the inventive concept.
Figure 10:
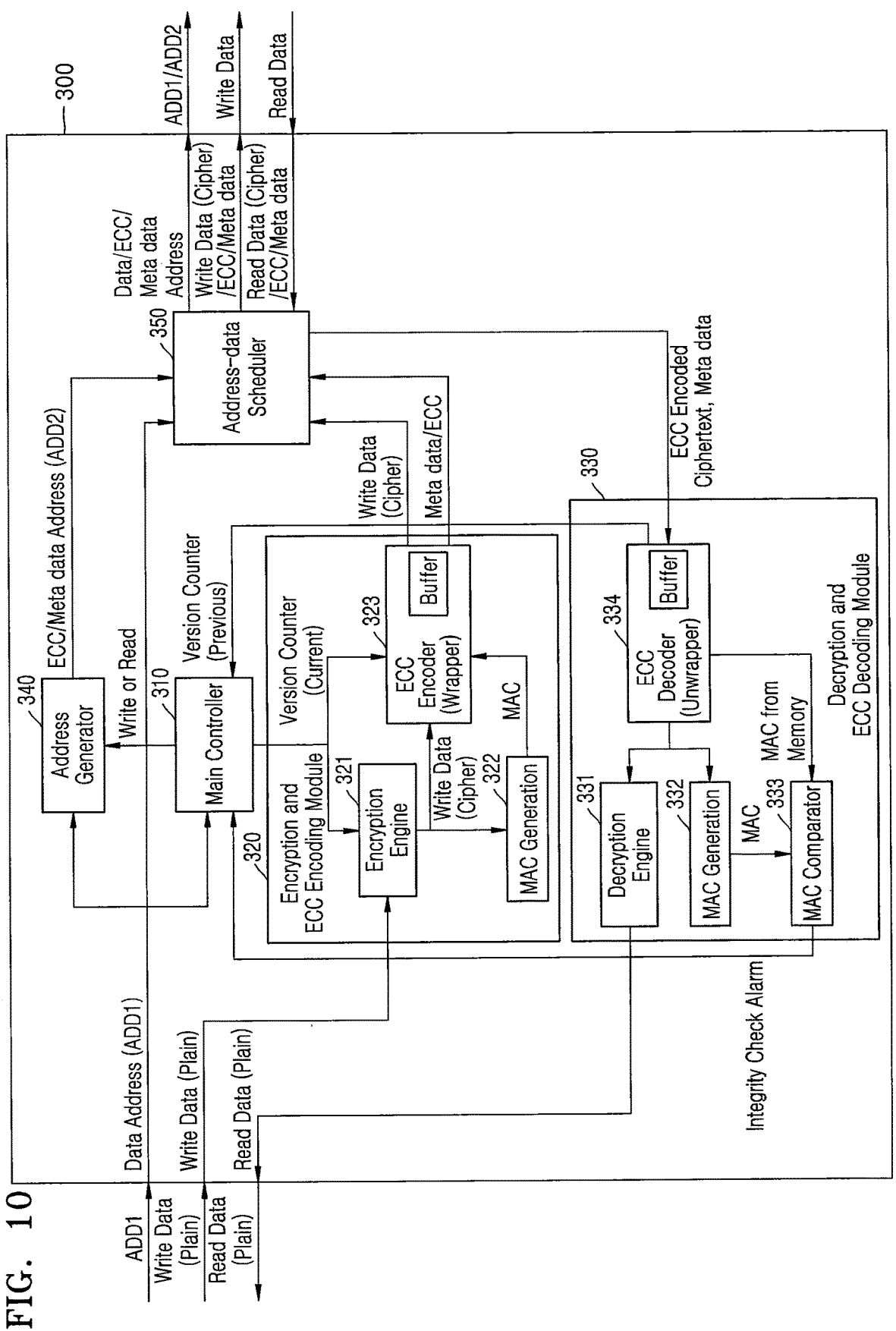

FIGS. 9 and 10 are block diagrams illustrating implementation examples of a security processor 300 according to some embodiments of the inventive concept.

Referring to FIG. 9, the security processor 300 may include a main controller 310, an encryption and ECC encoding module 320, a decryption and ECC decoding module 330, an address generator 340, and an address-data scheduler 350. The encryption and ECC encoding module 320 may correspond to the encryption/ECC encoding processor 111 of FIG. 1 and the decryption and ECC decoding module 330 may correspond to the decryption/ECC decoding processor 112 of FIG. 1. In addition, the address generator 340 may be included in the address controller 113 of FIG. 1.

According to some embodiments, the security processor 300 may be included in a SOC (or an advanced driver assistant system (ADAS) SOC). Operation of the security processor 300 may be controlled by the CPU (not shown) provided in the SOC. Alternatively, according to other embodiments, the security processor 300 may be provided in the memory controller for controlling the memory. Alternatively, according to further embodiments, the SOC may include the security processor 300 and a memory control module. Some of the components illustrated in FIG. 9 may be provided in the security processor 300 and other components may be provided in the memory control module.

The SOC may be requested by an external device to read and store data. According to embodiments of the inventive concept, the security processor 300 may store the encrypted data in the memory (not shown) by performing the encryption operation and the ECC encoding processing on original data requested to be stored, read the encrypted data from the memory, generate the original data by performing the decryption operation and the ECC decoding processing on the read encrypted data, and may use the original data in the SOC or may provide the original data to an external device. The main controller 310 may control operations of the security processor 300 and, accordingly, the security processor 300 may perform operations in accordance with embodiments of the inventive concept.

As the data access request is provided to the SOC, the security processor 300 receives the first address ADD1 and write data from an internal component (for example, the CPU) of the SOC and may provide read data. According to the above-described embodiments, the address generator 340 may calculate the second address ADD2 that represents the position in which the Metadata and the ECC data are to be stored from the first address ADD1. The first address ADD1 from the outside and the second address ADD2 from the address generator 340 may be provided to the address-data scheduler 350. According to some embodiments, the address generator 340 may newly generate an address that represents a position in which the encrypted data is to be stored based on the first address ADD1 from the outside. The newly generated address may be provided to the address-data scheduler 350.

According to the above-described embodiments, in the read and write operations of the data, the number of accesses to the memory may vary. For example, in the case of the write operation of the data, a process of reading the Metadata requested for the encryption operation performed on the original data from the memory may be added. Because a memory access operation may vary in accordance with the read or write operation performed on the data, the main controller 310 may provide control information based on the read or write operation to the address generator 340. That is, the address generator 340 may calculate at least one address based on the first address ADD1 and the control information and may store the calculated address. In addition, when the first address ADD1 in accordance with a read request from the outside is received, the address generator 340 may generate at least one address corresponding to the first address ADD1 with reference to address information stored in the address generator 340 and may provide the generated address to the address-data scheduler 350.

According to the above-described embodiments, the encryption and ECC encoding module 320 may perform the encryption operation and the ECC encoding processing on the data and may provide the encrypted data, the Metadata, and the ECC data to the address-data scheduler 350. In addition, the decryption and ECC decoding module 330 may perform the decryption operation and the ECC decoding processing by using the encrypted data, the Metadata, and the ECC data that are read from the memory and may perform a MAC generation and comparison operation for an integrity check.

The main controller 310 may control a process related to the encryption/decryption operation and the ECC operation together with the control operation for the address generator 340. For example, the main controller 310 may manage information for the encryption/decryption operation, may manage an alarm operation in accordance with a security processing result, or may perform a manage operation on an error found by the ECC operation.

The address-data scheduler 350 may schedule a bus transaction in relation to a memory operation. For example, access requests for a plurality of data items may be provided from the external device. The address-data scheduler 350 may schedule an output operation for the data and the address and, accordingly, a plurality of encrypted data items and the Metadata and the ECC data that correspond to the encrypted data items may be stored in the memory or may be read from the memory. The data and the address from the address-data scheduler 350 may be provided to an external memory through the memory controller (not shown).

A function of the security processor 300 illustrated in FIG. 9 may be performed by a circuit as hardware, software, or a combination of hardware and software. For example, when a function of the security processor 300 is performed as software, the main controller 310 may include a processor configured to execute a program. One or more functions in the above-described embodiment may be performed by executing the program loaded on the memory inside or outside of the security processor 300.

In FIG. 10, an implementation example of the encryption and ECC encoding module 320 and the decryption and ECC decoding module 330, according to some embodiments of the inventive concept, is illustrated. Referring to FIG. 10, the encryption and ECC encoding module 320 may include an encryption engine 321, a MAC generator 322, and an ECC encoder 323. In addition, the decryption and ECC decoding module 330 may include a decryption engine 331, a MAC generator 332, a MAC comparator 333, and an ECC decoder 334. The ECC encoder 323 may perform a function (for example, wrapping) of integrally providing the Metadata and the ECC data to the address-data scheduler 350. For example, as a buffer is provided in the ECC encoder 323, the sequentially received Metadata and ECC data may be stored in the buffer and the Metadata and the ECC data that are stored in the buffer may be integrally provided to the address-data scheduler 350. The decryption and ECC decoding module 330 may include a buffer for temporarily storing the integrally read Metadata and ECC data and may perform a function (for example, unwrapping) of providing the Metadata and the ECC data to a corresponding processing block at different times.

Figure 11:
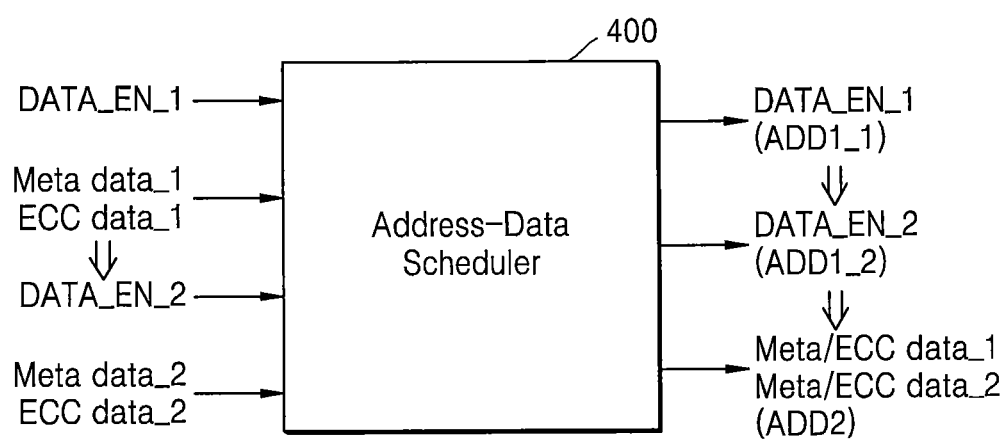
FIG. 11 is a block diagram illustrating operations of a security processor according to some embodiments of the inventive concept.

FIG. 11 is a block diagram illustrating example operations of a security processor according to some embodiments of the inventive concept.

Referring to FIG. 11, the security processor includes an address-data scheduler 400 and may receive the encrypted data, the Metadata, the ECC data, and the address according to the above-described embodiments during a data write operation. For example, as different encrypted data items, first encrypted data DATA_EN_1 and first Metadata Metadata_1 and first ECC data ECC data_1 corresponding to the first encrypted data DATA_EN_1 may be provided to the address-data scheduler 400. Then, second encrypted data DATA_EN_2 and second Metadata Metadata_2 and second ECC data ECC data_2 corresponding to the second encrypted data DATA_EN_2 may be provided to the address-data scheduler 400. Addresses may be further provided from an address generator (not shown) to the address-data scheduler 400.

The address-data scheduler 400 may schedule operations of outputting the data items and the addresses in relation to operations of storing the data items in the memory. For example, when the sum of a size of the first Metadata Metadata_1 and the first ECC data ECC data_1 and a size of the second Metadata Metadata_2 and the second ECC data ECC data_2 is smaller than a bandwidth between the memory controller and the memory (not shown), scheduling may be performed so that the Metadata items and the ECC data items are stored in the memory together. For example, after the address-data scheduler 400 outputs the first encrypted data DATA_EN_1 and a first address ADD1_1 corresponding to the first encrypted data DATA_EN_1 and the second encrypted data DATA_EN_2 and a first address ADD1_1 corresponding to the second encrypted data DATA_EN_2, the address-data scheduler 400 may output the Metadata items and the ECC data items related to the first and second encrypted data items DATA_EN_1 and DATA_EN_2 and the second address ADD2 corresponding to the Metadata items and the ECC data items. That is, based on the scheduling of the address-data scheduler 400, the Metadata items and the ECC data items related to at least two encrypted data items may be integrally stored in the memory and/or may be read from the memory.

Figure 12A:
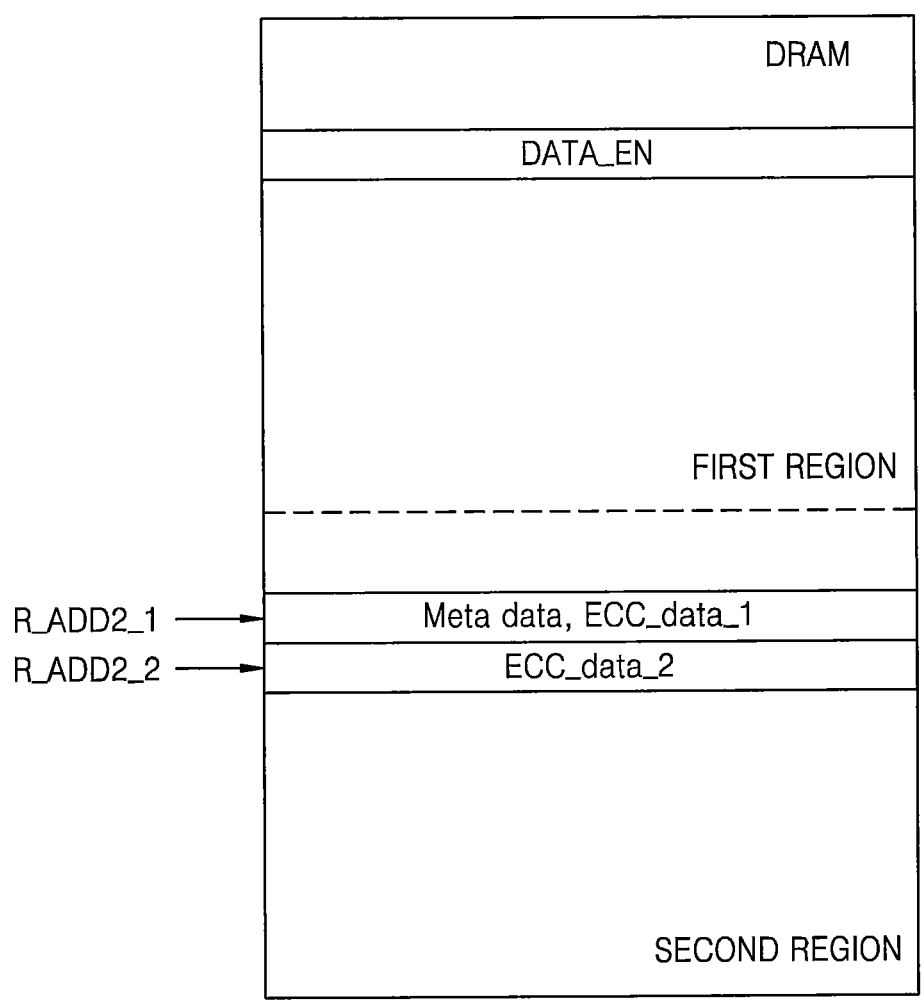
FIGS. 12A and 12B are block diagrams illustrating an example in which Metadata and ECC data are stored in memory according to some embodiments of the inventive concept.
Figure 12B:
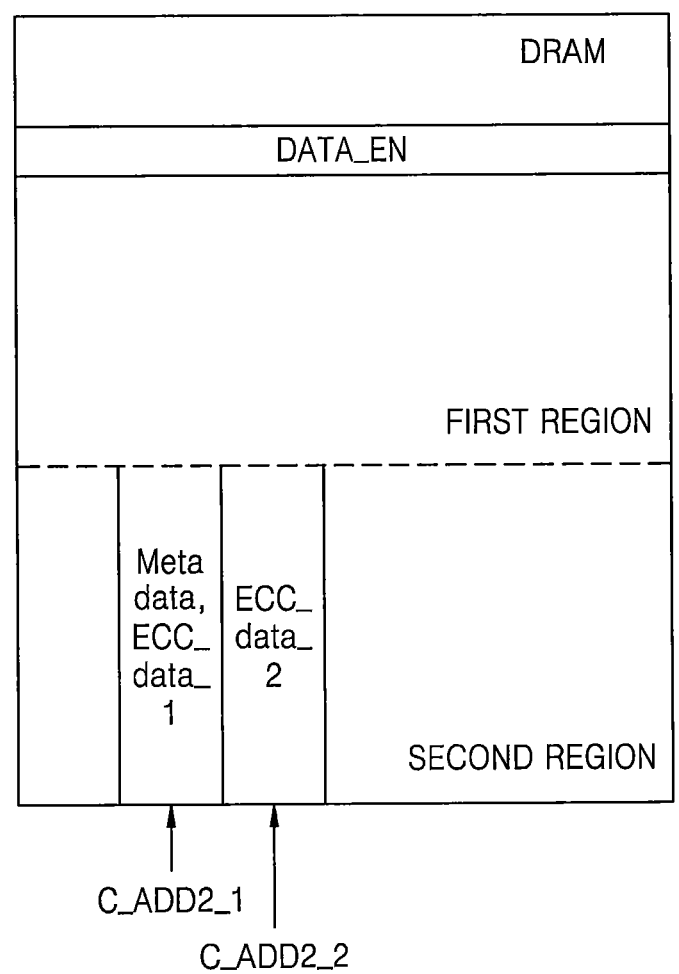

FIGS. 12A and 12B are block diagrams illustrating an example in which Metadata and ECC data are stored in memory according to some embodiments of the inventive concept.

Referring to FIG. 12A, the encrypted data DATA_EN is generated in accordance with a data encryption operation and the encrypted data DATA_EN may be stored in the first region of the DRAM as the memory. In addition, the Metadata and the ECC data that correspond to the encrypted data DATA_EN may be stored in the second region of the memory based on an address generating operation.

When the address generating operation is performed and, accordingly, the Metadata and the ECC data are stored in the small number of rows, at least some of the Metadata and the ECC data may be stored in the same row. For example, when the ECC data includes the first ECC data ECC data_1 for the encrypted data DATA_EN and the second ECC data ECC data_2 for the Metadata, the Metadata and the first ECC data ECC data_1 are stored in the same row in response to a row address R_ADD2_1 from the address generator and the second ECC data ECC data_2 may be stored in a neighboring row in response to a row address R_ADD2_2 from the address generator.

FIG. 12B illustrates performance of the address generating operation in which the Metadata and the ECC data are stored in a relatively small number of columns. At least some of the Metadata and the ECC data may be stored in the same column. For example, the Metadata and the first ECC data ECC data_1 may be stored in the same column in response to a column address C_ADD2_1 from the address generator and the second ECC data ECC data_2 may be stored in a neighboring column in response to a column address C_ADD2_2 from the address generator.

The embodiments of the inventive concept are not limited to the storage method illustrated in FIGS. 12A and 12B. The Metadata and the ECC data may be stored in a greater number of rows or columns based on the size of the Metadata and the ECC data. In addition, kinds of data items stored in the same row or in the same column may vary.

Figure 13:
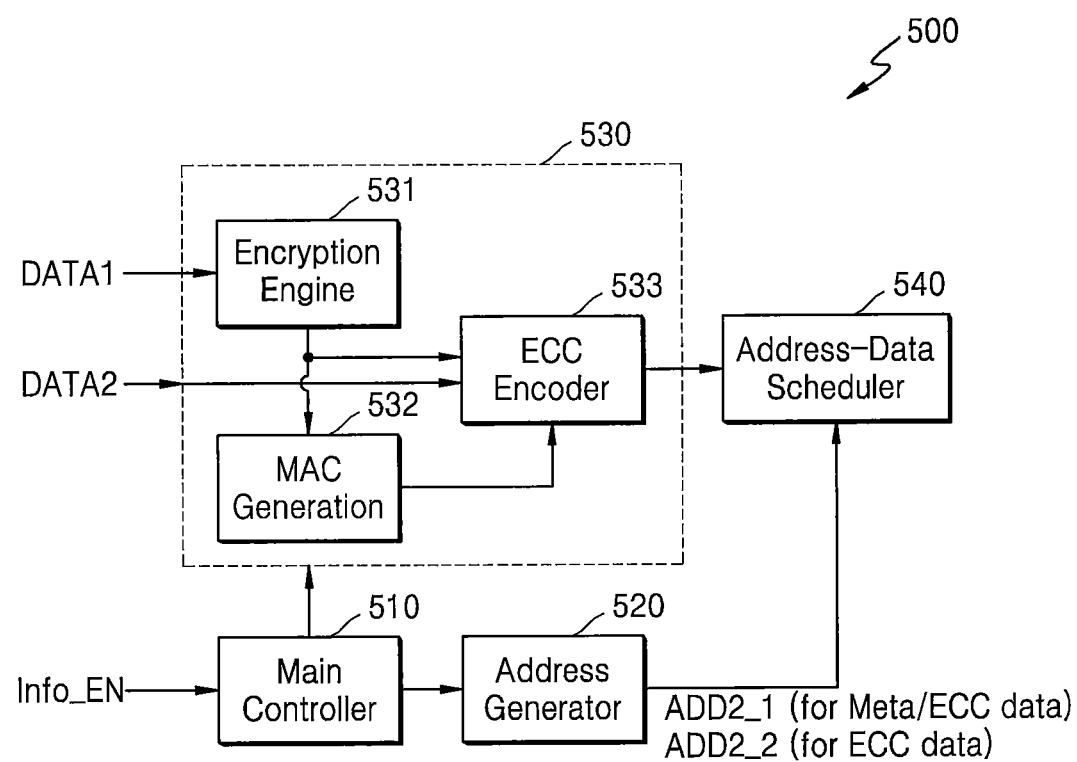
FIG. 13 is a block diagram illustrating a security processor according to some embodiments of the inventive concept.

FIG. 13 is a block diagram illustrating a security processor 500 according to some embodiments of the inventive concept. In FIG. 13, an example in which an encryption operation for data is selectively performed is illustrated.

Referring to FIG. 13, the security processor 500 may include a main controller 510, an address generator 520, an encryption and ECC encoding module 530, and an address-data scheduler 540. In addition, the main controller 510 may control operations of the security processor 500 and the encryption and ECC encoding module 530 may include an encryption engine 531, a MAC generator 532, and an ECC encoder 533.

In storing data in the memory, the security processor 500 or a SOC (not shown) including the security processor 500 may determine whether the data is encrypted. When it is assumed that the SOC determines whether the data is encrypted, in an operation of writing the data, information Info_EN that represents whether the data is encrypted may be provided to the main controller 510 and the main controller 510 may control an encryption operation and ECC encoding module 530 based on the information Info_EN.

For example, assuming that the encryption operation is performed on the first data DATA1 and the encryption operation is not performed on the second data DATA2, the following may be performed: The encryption engine 531 performs the encryption operation on the first data DATA1, provides the encrypted data to the MAC generator 532, and may provide the encrypted data and the Metadata (for example, information, such as a version counter) to the ECC encoder 533. In addition, the MAC from the MAC generator 532 may be provided to the ECC encoder 533 as the Metadata and the ECC encoder 533 may generate the first ECC data for the encrypted data and the second ECC data for the Metadata. The ECC encoder 533 may generate the ECC data for the second data DATA2 without performing the encryption operation on the second data DATA2.

The main controller 510 may control operations of the address generator 520 based on the information Info_EN. According to the above-described embodiments, the address generator 520 may calculate the second address by using the address (for example, the first address) related to storage of the first and second data items DATA1 and DATA2, may calculate the second address ADD2_1 for storing the Metadata and the ECC data in relation to the first data DATA1, and may calculate the second address ADD2_2 for storing the ECC data in relation to the second data DATA2. The data and addresses generated as described above may be provided to the address-data scheduler 540.

The address generator 520 may perform the address generating operation so as to have information for storing more data in generating the second address ADD2_1 related to the first data DATA1. When the second address ADD2_2 related to the second data DATA2 is generated, the address generating operation may be performed so as to have information for storing a relatively small amount of data. Therefore, when the encryption operation is not performed, the ECC data related to more data items may be stored in the same row or in the same column of the memory. In addition, according to the above-described embodiments, the address-data scheduler 540 may control the order in which the addresses and/or the data items are output, output a greater number of data items and the addresses corresponding to the data items when the encryption operation is not performed, and may perform scheduling and, accordingly, the ECC data items related to the greater number of data items may be integrally provided to the memory.

Figure 14:
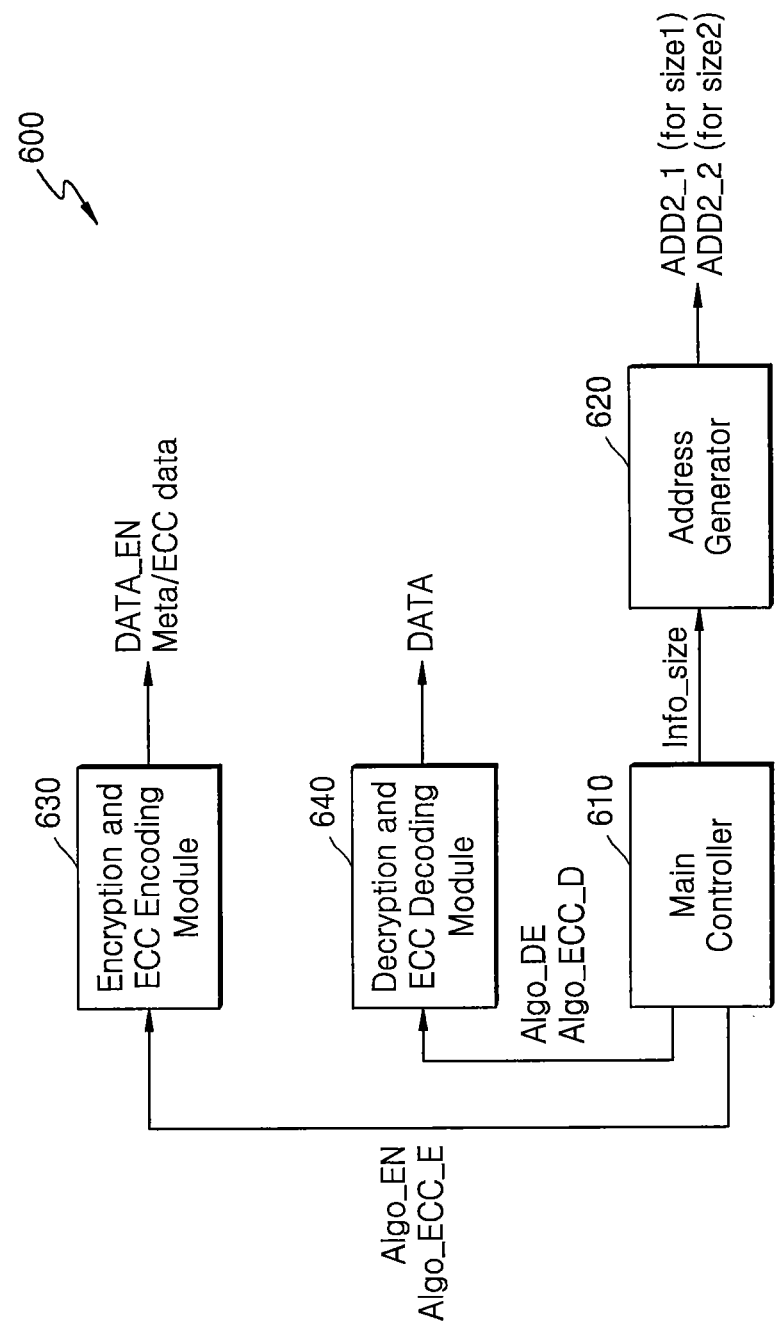
FIG. 14 is a block diagram illustrating a security processor according to further embodiments of the inventive concept.

FIG. 14 is a block diagram illustrating a security processor 600 according to further embodiments of the inventive concept.

Referring to FIG. 14, the security processor 600 may include a main controller 610, an address generator 620, an encryption and ECC encoding module 630, and a decryption and ECC decoding module 640. In addition, the main controller 610 may control operations of the security processor 600. Based on control of the security processor 600 or a SOC including the security processor 600, an algorithm used for the encryption/decryption operation and an algorithm used for the ECC operation may be selected. In addition, a size of the Metadata and a size of the ECC data may change in accordance with the algorithm used for the encryption/decryption operation and the algorithm used for the ECC operation.

As a kind of the algorithm is selected based on control of the main controller 610, the main controller 610 may provide encryption algorithm information Algo_EN and ECC encoding algorithm information Algo_ECC_E to the encryption and ECC encoding module 630. In addition, the main controller 610 may provide the decryption algorithm information Algo_DE and ECC decoding algorithm information Algo_ECC_D to the decryption and ECC encoding module 640. In addition, the main controller 610 may provide information Info_size on a size of additional data generated by the encryption operation and the ECC operation in accordance with the selected algorithm to the address generator 620 and the address generator 620 may further refer to the information Infor_size in generating the second address.

Assuming that additional data having a first size greater than that of the first data is generated and additional data having a second size smaller than that of the second data is generated, the address generator 620 may generate the second addresses ADD2_1 and ADD2_2 for generating the additional data items having different sizes. For example, when the size of the additional data is relatively small, the Metadata and the ECC data may be stored in a small number of rows or columns and the additional data (the Metadata and the ECC data) related to more data items may be stored in the same row or in the same column of the memory. In addition, according to the above-described embodiments, a scheduling operation of an address-data scheduler (not shown) may change based on the size of the additional data.

Figure 15:
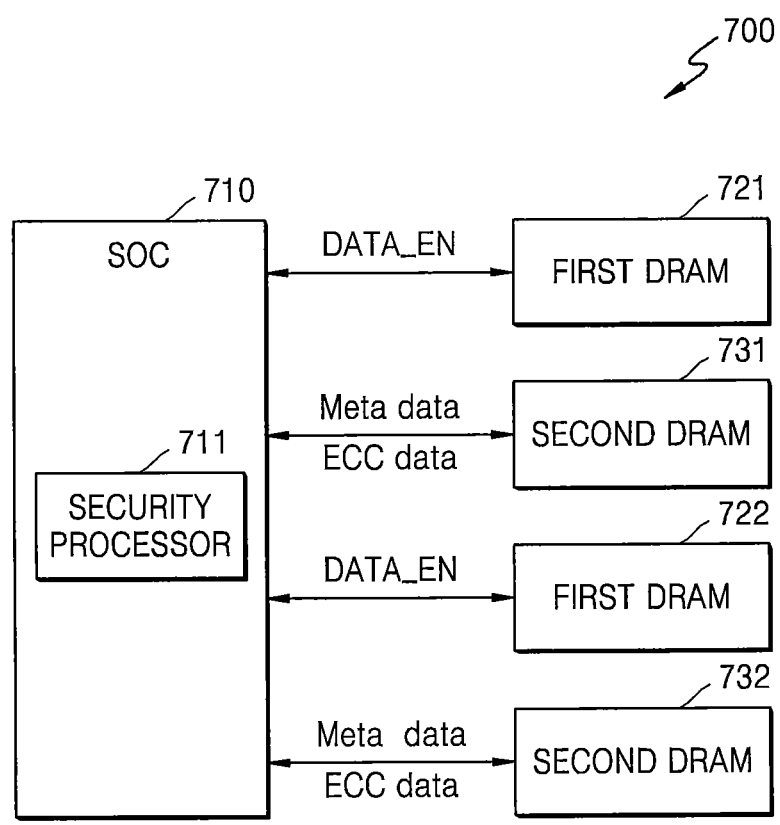
FIG. 15 is a block diagram illustrating an example in which a security processor according to some embodiments of the inventive concept is applied to a sideband ECC method.

FIG. 15 is a block diagram illustrating an example in which a security processor according to some embodiments of the inventive concept is used in a sideband ECC method.

In the above-described embodiments, it is illustrated that the encrypted data and the additional data are stored in different regions in the same memory (for example, the same DRAM chip), which may correspond to an in-line ECC method in which a space of the memory is logically divided to allot a storage space for the ECC data. In some embodiments of the inventive concept, an operation of storing the encrypted data and the additional data may be managed so as to correspond to another ECC method. For example, the storage operation may be managed in the same method as or in a similar method to the sideband ECC method in which the ECC data is stored in a DRAM chip different from a DRAM chip in which common data (for example, user data) is stored. The DRAM chip may perform a data access operation in accordance with one of various kinds of specifications, for example, LPDDR (such as LPDDR4, LPDDR4X, or LPDDR5).

For example, referring to FIG. 15, a data processing system 700 includes a SOC 710 and a plurality of memories and the SOC 710 may include a security processor 711 according to the above-described embodiments. In addition, the plurality of memories may include one or more first DRAM chips 721 and 722 for storing the encrypted data and one or more second DRAM chips 731 and 732 for storing the additional data including the Metadata and the ECC data. In FIG. 15, the two first DRAM chips 721 and 722 and the two second DRAM chips 731 and 732 are illustrated. However, embodiments of the inventive concept are not limited thereto. Various numbers of first DRAM chips and second DRAM chips may be provided in the data processing system 700.

The encrypted data DATA_EN of a predetermined unit may be stored in at least one of the first DRAM chips 721 and 722. In addition, according to the addresses generated by an address generator (not shown) in the security processor 711, the Metadata and the ECC data may be stored in at least one of the second DRAM chips 731 and 732. According to some embodiments, because the Metadata and the ECC data may be stored in a different DRAM chip from a DRAM chip in which the encrypted data DATA_EN is stored, the address generator in the security processor 711 may further generate a chip address that represents a position of the DRAM chip. Therefore, the chip address may be integrally generated for the Metadata and the ECC data.

As the data is managed by the sideband ECC method as described above, because an additional bandwidth devoted solely for communication of the Metadata and the ECC data may be provided, the number of accesses to the data may be reduced and an access speed may increase. In addition, a storage space abandoned without being used due to a production specification of a second DRAM chip may be used for storing the Metadata. Therefore, use efficiency of the memory may improve.

Figure 16:
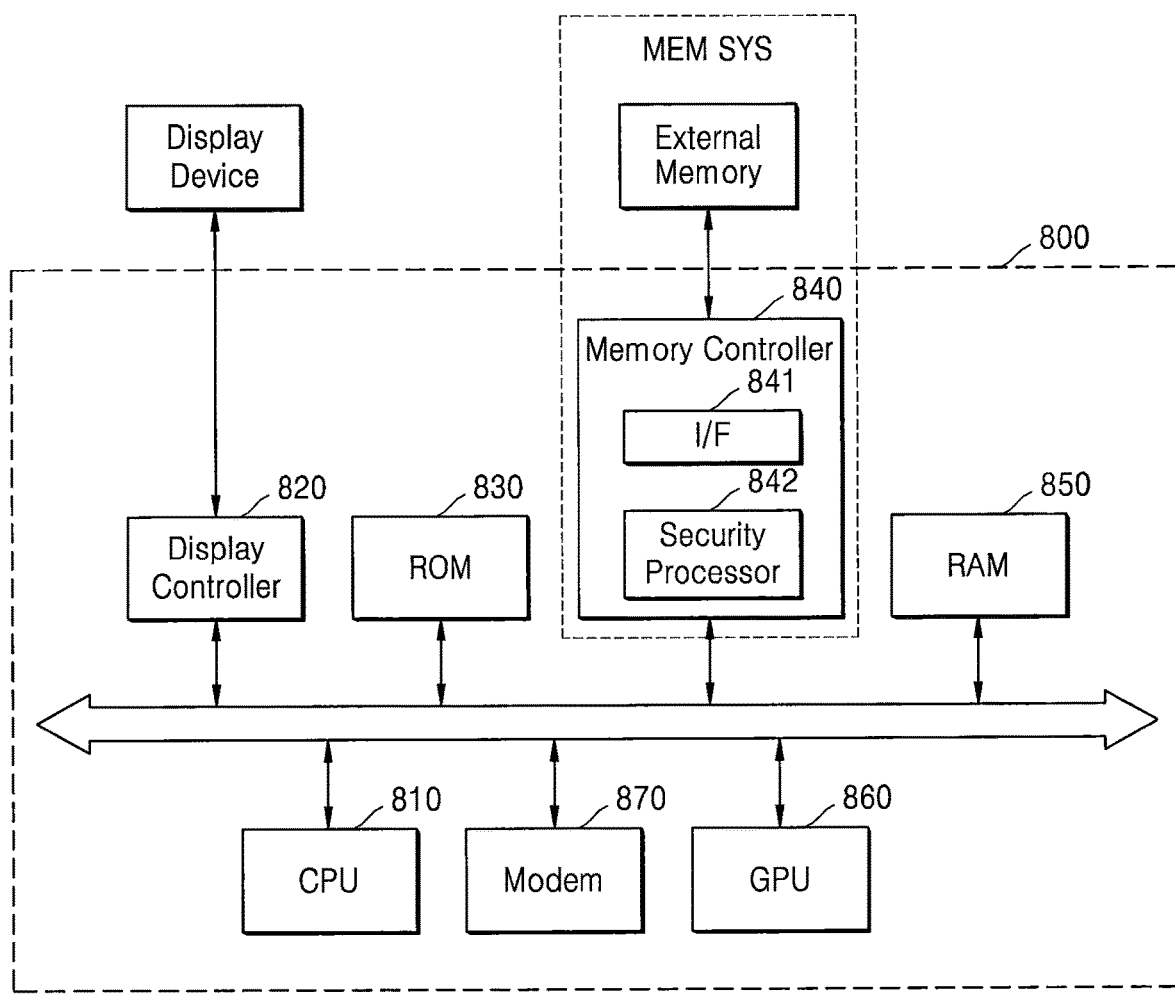
FIG. 16 is a block diagram illustrating an example of an SOC according to some embodiments of the inventive concept.

FIG. 16 is a block diagram illustrating an implementation example of a SOC 800 according to some embodiments of the inventive concept. The SOC described in the following embodiments may include an application processor.

Referring to FIG. 16, the SOC 800 may include a CPU 810, a display controller 820, read only memory (ROM) 830, a memory controller 840, and random access memory (RAM) 850. In addition, the SOC 800 may further include a GPU 860. In addition, when the SOC 800 further includes a modem 870, the SOC 800 may be referred to as ModAP. The SOC 800 may further include various kinds of functional blocks, such as a power management unit and a clock unit.

The CPU 810 may process or execute programs or data stored in the ROM 830 and/or the RAM 850. For example, the CPU 810 may process or execute the programs and the data in accordance with an operation clock. The CPU 810 may be implemented by a multi-core processor. The multi-core processor is a computing component having two or more independent processors (for example, cores). Each of the processors may read and execute program instructions.

The ROM 830 may store the programs and/or the data in a non-volatile method. The ROM 830 may be implemented by an erasable programmable read-only memory (EPROM) or an electrically erasable programmable read-only memory. In addition, the RAM 850 may temporarily store programs, data, and instructions. For example, the programs and/or data stored in the ROM 830 may be temporarily stored in the RAM 850 in accordance with control of the CPU 810. The RAM 850 may be implemented by memory types, such as dynamic RAM (DRAM) or static RAM (SRAM).

The memory controller 840 includes an interface circuit 841 for interfacing with an external memory device, controls the external memory device in accordance with a data access request, and writes or reads data. In addition, the display controller 820 may control a display operation of a screen by driving a display device.

According to some embodiments of the inventive concept, a security processor 842 may be provided in one of various positions in the SOC 800. In FIG. 16, it is illustrated that the security processor 842 is implemented in the memory controller 840. That is, a function of the security processor 842 in the above-described embodiments may be performed by the memory controller 840. The memory controller 840 may perform a control operation for storing the encrypted data and the Metadata/the ECC data. For example, the encrypted data and the Metadata/the ECC data may be stored in the RAM 850 of the SOC 800 or in the external memory device. In addition, the Metadata/the ECC data may be integrally managed. For example, the storage space of the external memory device may be logically divided into the first region and the second region and may be managed accordingly. The Metadata/the ECC data may be stored in the second region. In other embodiments, the external memory device may include a plurality of memory chips and the Metadata/the ECC data may be managed to be stored in the same memory chip.

In the embodiments of FIG. 16, it is illustrated that the memory controller 840 is provided in the SOC 800. However, embodiments of the inventive concept are not limited thereto. For example, the memory controller 840 may be implemented by an additional semiconductor chip and the security processor 842, according to some embodiments of the inventive concept, may be provided in the memory controller 840 implemented by the additional semiconductor chip. In addition, the memory controller 840 implemented by the additional semiconductor chip and the memory (for example, the external memory device) may configure a memory system MEM SYS according to some embodiments of the inventive concept.

Figure 17:
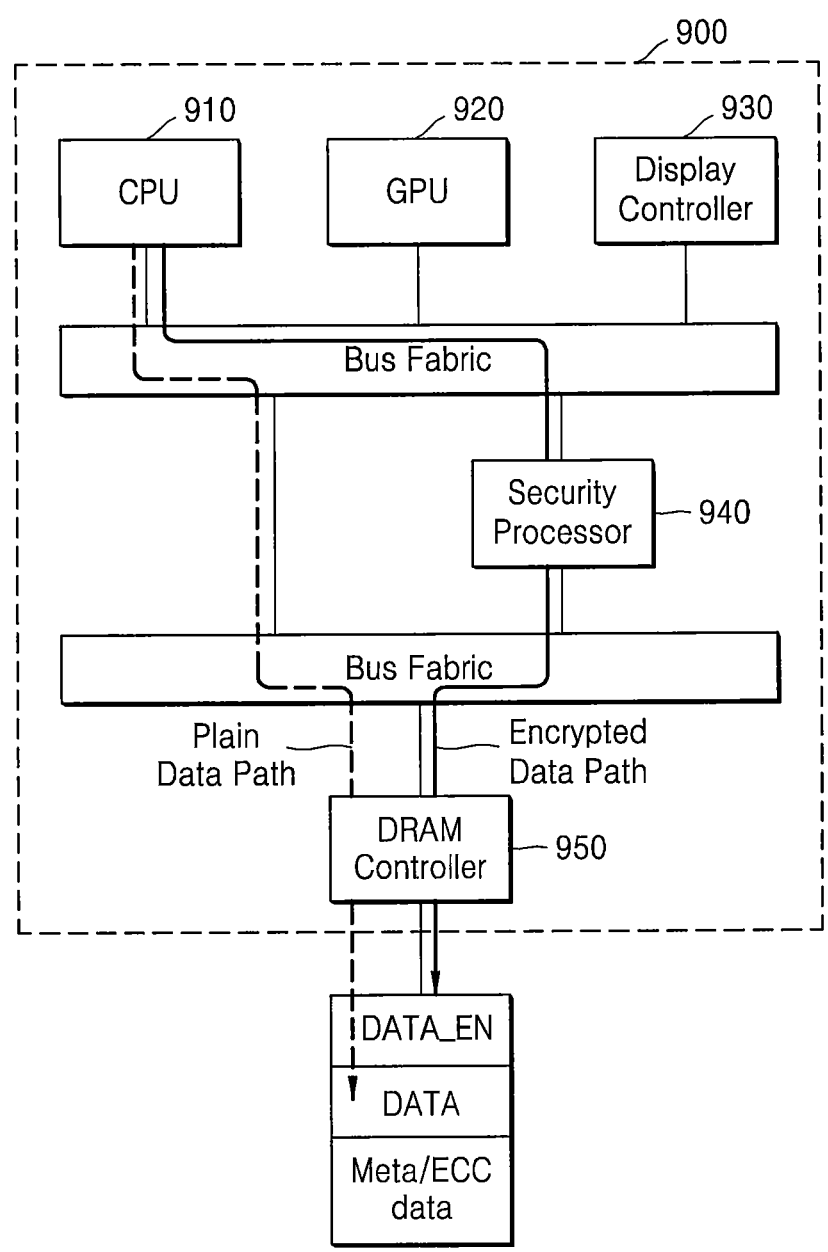
FIG. 17 is a block diagram illustrating an example of a SOC according to further embodiments of the inventive concept.

FIG. 17 is a block diagram illustrating an implementation example of a SOC 900 according to some embodiments of the inventive concept. Although some of the components illustrated in FIG. 16 are not illustrated in FIG. 17 for convenience of description, the SOC according to embodiments of the inventive concept may further include other various components. In addition, in describing a configuration and operation example of the SOC illustrated in FIG. 17, description previously provided with respect to the above-described embodiments will not be repeated.

Referring to FIG. 17, the SOC 900 may include a CPU 910, a GPU 920, a display controller 930, a security processor 940, and a memory controller 950. The DRAM controller may be an example of the memory controller 950. In addition, the memory controller 950 may control the external memory device and the external memory device may be divided into a plurality of regions in accordance with a kind of stored data.

The CPU 910 may control operations of the SOC 900. For example, the CPU 910 provides data and addresses to which access is requested to the security processor 940 or the memory controller 950. For example, various kinds of data items may be stored in the external memory device. Data that does not need to be encrypted may be provided to the external memory device via a plain data path through the CPU 910 and the memory controller 950. Conversely, data that needs to be encrypted may be provided to the external memory device via an encrypted data path through the CPU 910 and the security processor 940.

The SOC 900 illustrated in FIG. 17 may process data by one of various methods. When the ECC operation is performed on data that does not need to be encrypted, the memory controller 950 may generate the ECC data through the ECC operation for the data DATA. The data that needs to be encrypted is processed by the security processor 940 according to the above-described embodiments and, accordingly, the encrypted data DATA_EN and the Metadata/the ECC data Meta/ECC data corresponding to the encrypted data DATA_EN may be generated. In addition, the address generating operation may be performed and, accordingly, the Metadata/the ECC data Meta/ECC data are stored in the same region of the external memory device.

Figure 18:
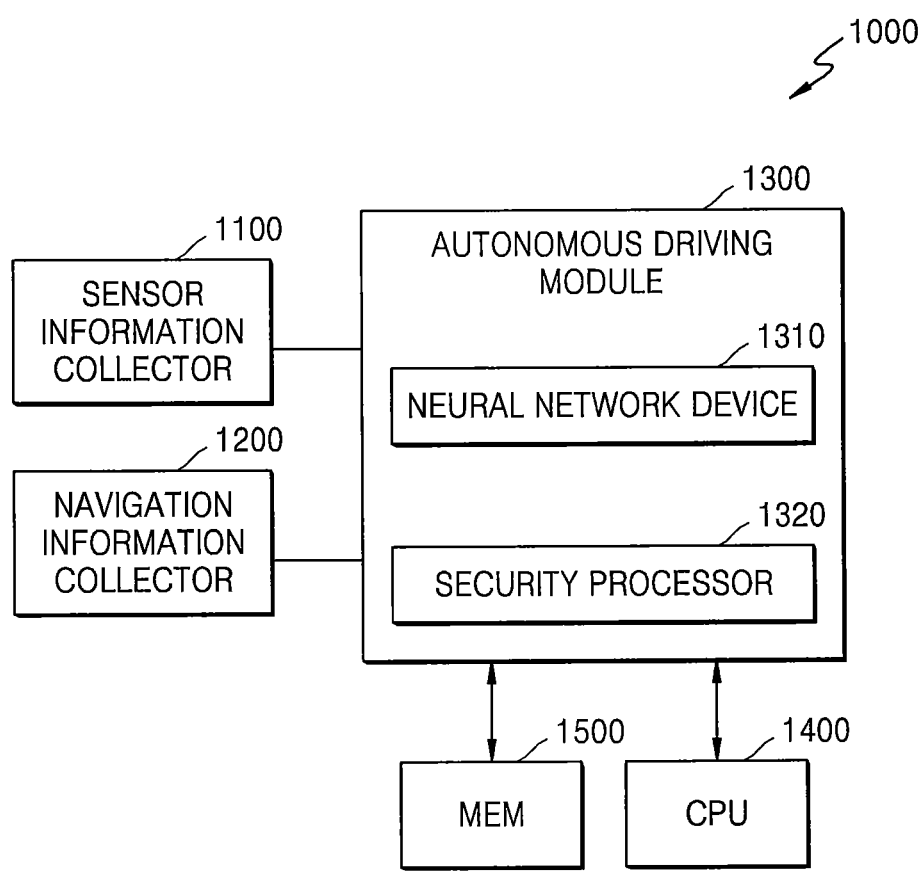
FIG. 18 is a block diagram illustrating an example in which a security processor according to some embodiments of the inventive concept is implemented in an autonomous driving system used in a vehicle.

FIG. 18 is a block diagram illustrating an example in which a security processor according to some embodiments of the inventive concept is implemented in an autonomous driving system 1000 used in a vehicle. The system illustrated in FIG. 18 may correspond to the autonomous driving system 1000 and the autonomous driving system 1000 may include a sensor information collector 1100, a navigation information collector 1200, an autonomous driving module 1300, a CPU 1400, and a memory 1500. In addition, the autonomous driving module 1300 may include a neural network device 1310 and a security processor 1320.

The neural network device 1310 performs a neural network operation using various image and voice information items and may generate information signals, such as an image recognition result and a voice recognition result based on the performance result. For example, the sensor information collector 1100 includes devices that may collect the various image and voice information items, such as a camera and a microphone, and may provide the collected various image and voice information items to the autonomous driving module 1300. In addition, the navigation information collector 1200 may provide various information items (for example, position information) related to vehicle driving to the autonomous driving module 1300. The neural network device 1310 executes various kinds of neural network models by using information from the sensor information collector 1100 and/or the navigation information collector 1200 as an input and may generate the information signals. When the sensor information collector 1100 includes a camera or a microphone, the security processor 1320 of the autonomous driving module 1300 may perform the encryption/decryption operation and the ECC operation as security processing for the voice data or the image data from the sensor information collector 1100. According to the above-described embodiments, the encrypted data and the Metadata/the ECC data may be stored in a memory 1500.

In FIG. 18, it is illustrated that an embodiment of the inventive concept is used in an autonomous driving system. However, embodiments of the inventive concept may be used in products in which security functions are requested for camera sensors, such as IoT and a monitoring camera.

While the inventive concept has been particularly shown and described with reference to embodiments thereof, it will be understood that various changes in form and details may be made therein without departing from the spirit and scope of the following claims.

What is claimed is:

1. A system on chip (SOC) comprising:
a security processor configured to perform an encryption/decryption operation on data and an error correction code (ECC) operation on the data,
wherein the security processor comprises:
an encryption/ECC encoding processor configured to perform the encryption operation on the data using Metadata and to generate ECC data by performing ECC encoding processing on the encrypted data and the Metadata;
a decryption/ECC decoding processor configured to extract the encrypted data and the Metadata by performing ECC decoding processing using the ECC data and to recover the data by performing a decryption operation on the encrypted data using the Metadata; and
an address controller configured to receive a first address related to storage of the encrypted data in a first region of a single standalone memory unit, to generate a second address based on the first address and a size of the Metadata and the ECC data, and to indicate a second region of the single standalone memory unit for storing the Metadata and the ECC data based on the generated second address.

2. The system on chip of claim 1, further comprising a main controller configured to receive an external write request or an external read request of the data and to output control information;
wherein the address controller is further configured to perform the address generating operation in accordance with a kind of external request.

3. The system on chip of claim 1, further comprising an address scheduler configured to receive a plurality of encrypted data and ECC data from the encryption/ECC encoding processor, to receive a plurality of second addresses respectively corresponding to the ECC data from the address controller, and to schedule an output operation of the encrypted data and the ECC data and the plurality of second addresses.

4. The system on chip of claim 3,
wherein the encryption/ECC encoding processor comprises a buffer configured to store the Metadata and the ECC data that are generated at different times, and
wherein the buffer is configured to provide the Metadata and the ECC data to the address scheduler in parallel.

5. The system on chip of claim 3, wherein the address scheduler is configured to output the plurality of encrypted data and first addresses respectively corresponding to the encrypted data and to perform output scheduling of Metadata and ECC data that correspond to the plurality of encrypted data and a second address corresponding to the Metadata and the ECC data.

6. The system on chip of claim 1,
wherein the ECC data comprises first ECC data generated by using the encrypted data and second ECC data generated by using the Metadata, and
wherein the first ECC data and the second ECC data are stored in the single standalone memory unit in response to the second address.

7. The system on chip of claim 6, wherein at least some of the Metadata, the first ECC data, and the second ECC data are stored in the same row of the single standalone memory unit based on the second address.

8. The system on chip of claim 6, wherein at least some of the Metadata, the first ECC data, and the second ECC data are stored in the same column of the single standalone memory unit based on the second address.

9. The system on chip of claim 1,
wherein the first region and the second region are logically divided, and
wherein the single standalone memory unit is configured to simultaneously store the Metadata and the ECC data in the second region based on the second address.

10. The system on chip of claim 1,
wherein the address controller comprises an address storage circuit configured to store the generated second address, and
wherein, in a read operation performed on the data, the address controller is configured to receive the first address related to reading of the data and to read the second address corresponding to the received first address from the address storage circuit.

11. The system on chip of claim 1, further comprising a memory controller that is configured to communicate with an external memory,
wherein the memory controller is further configured to provide the data to the single standalone memory unit without passing the data through the security processor when an encryption operation is not performed on the data, and
wherein the memory controller is further configured to provide the data to the single standalone memory unit by passing the data through the security processor when an encryption operation is performed on the data.

12. A method of operating a system on chip, the method comprising:
receiving data and a first address corresponding to the data; generating encrypted data by performing an encryption operation on the data by using Metadata, the first address being associated with a first region of a single standalone memory unit for storing the encrypted data;
generating error correction code (ECC) data by performing ECC encoding processing on the encrypted data and the Metadata; and generating a second address that represents positions in which the Metadata and the ECC data are stored in a second region of the single standalone memory unit based on the first address and a size of the Metadata and the ECC data, the second address being associated with the second region of the single standalone memory unit for storing the Metadata and the ECC data, and wherein the second address comprises information by which at least some of the Metadata and the ECC data are stored in a same row or in a same column in the single standalone memory unit.

13. The method of claim 12,
wherein the ECC data comprises first ECC data generated by using the encrypted data and second ECC data generated by using the Metadata, and
wherein the Metadata, the first ECC data, and the second ECC data are stored in the same row or in the same column in the single standalone memory unit based on the second address.

14. The method of claim 12, wherein the second address is generated in response to a data unit including the Metadata and the ECC data that are generated in response to data of an encryption unit.

15. The method of claim 12, further comprising:
storing the generated second address;
receiving a request to read data corresponding to the first address; and
reading at least some of the Metadata and the ECC data from the single standalone memory unit by using the second address corresponding to the first address among stored addresses.

16. The method of claim 12,
wherein the SOC is configured to access a first memory chip and a second memory chip that are implemented by separate chips, and
wherein the Metadata and the ECC data are stored in the same memory chip responsive to generating the second address.

17. A memory system, comprising: a memory controller that is configured to communicate with a memory, wherein the memory controller comprises: an encryption/ECC encoding processor configured to perform an encryption operation on data by using Metadata and to generate ECC data by performing ECC encoding processing on encrypted data and the Metadata; a decryption/ECC decoding processor configured to extract the encrypted data and the Metadata by performing ECC decoding processing by using the ECC data and to recover the data by performing a decryption operation on the encrypted data by using the Metadata; an address controller configured to receive a first address related to storage of the encrypted data in a first region of a single standalone memory unit, to generate a second address based on the first address and a size of the Metadata and the ECC data, and to indicate a second region of the single standalone memory unit for storing the Metadata and the ECC data based on the generated second address; and an interface circuit configured to interface with the single standalone memory unit for data access based on the first and second addresses.

18. The memory system of claim 17,
wherein the ECC data comprises first ECC data generated by using the encrypted data and second ECC data generated by using the Metadata, and
wherein the address controller is further configured to perform the address generating operation for storing the first ECC data and the second ECC data in the single standalone memory unit based on the second address.

19. The memory system of claim 18, wherein the second address comprises information by which at least some of the Metadata, the first ECC data, and the second ECC data are stored in the same row or in the same column of the single standalone memory unit.

20. The memory system of claim 17, wherein the single standalone memory unit comprises one or more dynamic random access memories (DRAM),
wherein the first region and the second region are logically divided, and
wherein the second address comprises information by which the Metadata and the ECC data are stored in the second region.

* * * * *